United States Patent
Alexander et al.

(10) Patent No.: US 12,124,699 B2
(45) Date of Patent: Oct. 22, 2024

(54) PROCESSING DEVICE FOR HANDLING MISALIGNED DATA

(71) Applicant: Graphcore Limited, Bristol (GB)

(72) Inventors: Alan Alexander, Wotton-Under-Edge (GB); Edward Andrews, Bristol (GB); Peter Hedinger, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 155 days.

(21) Appl. No.: 18/053,948

(22) Filed: Nov. 9, 2022

(65) Prior Publication Data

US 2023/0214116 A1 Jul. 6, 2023

(30) Foreign Application Priority Data

Dec. 31, 2021 (GB) ..................................... 2119133

(51) Int. Cl.
*G06F 3/06* (2006.01)
*G06F 9/30* (2018.01)

(52) U.S. Cl.
CPC .......... *G06F 3/0608* (2013.01); *G06F 3/0659* (2013.01); *G06F 3/067* (2013.01); *G06F 9/30036* (2013.01); *G06F 9/30109* (2013.01)

(58) Field of Classification Search
None
See application file for complete search history.

(56) References Cited

U.S. PATENT DOCUMENTS

| 2004/0098556 A1 | 5/2004 | Buxton |
| 2007/0106883 A1 | 5/2007 | Choquette |
| 2015/0261534 A1 | 9/2015 | Uliel |
| 2017/0177352 A1* | 6/2017 | Ould-Ahmed-Vall ...................... G06F 9/30032 |

OTHER PUBLICATIONS

Search Report dated Sep. 9, 2022 for United Kingdom Patent Application No. GB22119133.3. 3 pages.

* cited by examiner

*Primary Examiner* — Scott C Sun
(74) *Attorney, Agent, or Firm* — HAYNES AND BOONE, LLP

(57) ABSTRACT

A new type of instruction and a control register for the new type of instruction are provided to handle data that may be misaligned in memory. A first part of data (which may be misaligned in memory) is loaded into a first set of registers by loading a first atom containing the first part of data into registers. The pack instruction is executed by an execution unit to place part of data (whose length and starting position are indicated by second and third values in a control register) from one set of registers into an identified location (identified by a first value in the control register) in another set of registers.

26 Claims, 14 Drawing Sheets

PROCESSING DEVICE FOR HANDLING MISALIGNED DATA

CROSS-REFERENCE TO RELATED APPLICATIONS

The present application claims priority to United Kingdom Patent Application No. GB2119133.3, filed Dec. 31, 2021, the disclosure of which is hereby incorporated herein by reference in its entirety.

TECHNICAL FIELD

The present disclosure relates to a data processing device and in particular to a data processing device comprising an execution unit configured to execute instructions to access data from memory of the data processing device.

BACKGROUND

A processing device may comprise an execution unit and a memory. The execution unit is capable of executing one or more program threads in order to perform operations on data loaded from the memory to generate results, which are then stored in the memory. The results may be subject to subsequent processing by the execution unit or may be dispatched from the processing device.

When accessing data in the memory, there may be certain constraints on the access of that data in the memory. In particular, there may be architectural constraints that limit the memory addresses from which load and store operations may be performed. These memory addresses are determined in dependence upon the size of the load and store operations that are provided as part of the instruction set for the processing device.

Reference is made to FIG. 1, which illustrates a memory portion 100 from which units of data may be loaded by the execution unit and to which units of data may be stored by the execution unit. Suppose that the execution unit is configured to execute load instructions for units of data that are four bytes wide. In this case, each load instruction may cause any of the four units of data having a byte width of 4 bytes to be loaded from the memory portion 100. For example, a load instruction may cause four bytes of data to be loaded starting from memory address 0x80000 or may be used to cause four bytes of data to be loaded starting from memory address 0x80004. However, given the architectural constraints of the processing device, it is not possible to load data starting from memory address 0x80002, since this memory address is not aligned with the size of the memory accesses. A similar constraint is provided with respect to the stores. If each store instruction causes four bytes to be stored to memory portion 100, given the architectural constraints of the processing device, only stores that are 4 byte aligned may be performed. These memory addresses (e.g. at memory addresses 0x80000, 0x80004, 0x80008, 0x80012, 0x80016) at which load or store operations are permitted by the architectural constraints of the processing device are referred to herein as aligned memory addresses. Data for which at least one of its boundaries (i.e. its start and end address) do not fall on one of these aligned memory addresses is referred to as misaligned data.

SUMMARY

There is a problem with the limitations imposed upon the starting addresses of data for load and store operations, which is that in some cases it may be required to perform operations with respect to a portion of data that is not aligned in memory with the starting addresses for load or store operations. For example, in the example of FIG. 1, it may be required to load a portion of data starting from the memory address 0x80002 in memory portion 100. This portion of data may need to be loaded into a register for performing a particular one or more arithmetic operations or may be copied (by also performing a store) to another part of the memory. However, given the constraint, whereby only accesses to aligned memory addresses are permitted, any load operation to load the data starting at memory address 0x80002, will need to start from memory address 0x80000, and will therefore involve loading additional data that is not required (for the arithmetic operations or memory copy).

One proposed solution is to reduce the size of data accessed by the load and store instructions. For example, instead of using load instructions that load 4-byte units of data, a load instruction could be provided for performing loads of 1-byte units of data, such that any byte of data can be accessed individually from the memory portion 100. However, this can result in reduced performance—especially when the portion of data to be accessed from memory is large—since it may be required to execute a large number of load instructions.

Another proposed solution is to arrange all of the data to be accessed from memory such that it is aligned in memory. In this way, whenever a portion of data is to be loaded from memory, the start of that portion of data will be at an address that may function as the starting address for a load operation. However, ensuring alignment of data in memory may involve leaving holes in memory where no useful data is stored, since it is unlikely that all data on which it is required to operate will be of a size that is a multiple of the load access size. Providing holes between the useful data results in wasted memory space.

According to a first aspect, there is provided a data processing device comprising: a memory; and at least one execution unit configured to execute load instructions to perform load operations to load data from the memory, wherein the memory is configured to store a first unit of data, the first unit of data comprising a first part and one or more additional parts, wherein the data processing device comprises a second set of one or more registers configured to store a second unit of data; and a control register configured to store control values including: a first value indicating a starting position at which the first part is to be provided in a third unit of data; and a second value indicating a starting position of the first part in the first unit of data; and a third value indicating a length of the first part, wherein the at least one execution unit is configured to: execute at least one of the load instructions to perform a first of the load operations to load the first unit of data into a first set of one or more registers; and in response to execution of an instruction of a first type, and in dependence upon each of the control values, provide the third unit of data in a set of one or more registers with: the first part at one or more bit positions starting from the starting position indicated by the first value; and in remaining bit positions of the third unit of data, data from corresponding bit positions of the second unit of data.

A new type of instruction, which may be referred to as the pack instruction, and a control register for the new type of instruction are provided to handle data that may be misaligned in memory. The pack instruction is executed by an execution unit to place part of data (for which the length and starting position are indicated by the second and third values in the control register) held in one set of registers into an identified location (identified by the first value in the control register) in another set of registers. For example, a first part of data may be misaligned in memory. This first part of data is loaded into a first set of registers by loading a first unit (or first atom) of data containing the first part of data into those registers. A second set of registers comprises a second unit of data. Together, the first and second units provide data for a third unit data that it is desired to provide aligned in its own set of registers (either for performing arithmetic operations or for storing back to memory in aligned form). When the pack instruction is executed, the execution unit causes the third unit of data to be provided with the first part of data at the location identified by the first value and with its remaining bits being provided by corresponding bits of the second unit of data. The third unit of data may then be operated on or stored back to memory. The pack instruction may be used along with a second type of instruction, referred to as the extract instruction, for performing memory copies.

In some embodiments, the memory is configured to store the second unit of data, wherein the at least one execution unit is configured to, prior to executing the instruction of the first type: in response to execution of a further at least one of the load instructions, load the second unit of data into the second set of one or more registers.

In some embodiments, the set of one or more registers in which the third unit of data is stored is a third set of one or more registers that is different to the first set of one or more registers and the second set of one or more registers.

In some embodiments, the set of one or more registers in which the third unit of data is stored is the second set of one or more registers.

In some embodiments, the at least one execution unit is configured to execute the instruction of the first type in order to provide the third unit of data in the second set of one or more registers such that the first part overwrites part of the second unit of data.

In some embodiments, the at least one execution unit is configured to: prior to execution of the instruction of the first type, execute an initialisation instruction to, using one or more operands indicating a location of a buffer of data in the memory, provide the control values in the control register, wherein the buffer of data comprises the first part.

In some embodiments, the one or more operands of the initialisation instruction further indicate a location of a memory region in the memory to which the buffer of data is to be copied.

In some embodiments, the memory is configured to, prior to the execution of the instruction of the first type, store the second unit of data in the memory region.

In some embodiments, the first unit of data belongs to the buffer of data.

In some embodiments, the data processing device comprises a further control register configured to store a single value indicating: a starting position of a third part of data within a fourth unit of data; and an ending position of a fourth part of data within a fifth unit of data, wherein the at least one execution unit is configured to: execute a further instruction of a second type to, based on the single value, provide in a set of one or more registers, a sixth unit of data, the sixth unit of data comprising: the third part of data beginning at the starting position indicated by the single value; and the fourth part of data ending at the ending position indicated by the single value.

In some embodiments, the at least one execution unit is configured to perform a memory copy of a buffer in the memory by executing a sequence of instructions, wherein the memory is configured to store the buffer such that at least one of a start and end of the buffer is misaligned with a set of memory addresses supported as starting addresses for the load operations, the sequence of instructions comprising: a first instance of the instruction of the first type; a plurality of instances of the further instruction of the second type; and a second instance of the instruction of the first type.

In some embodiments, the at least one execution unit is configured to, prior to execution of the first instance of the instruction of the first type: execute at least one initialisation instruction to, using one or more operands indicating a location of the buffer in the memory, provide the single value in the further control register for use by at least one instance of the plurality of instances of the instruction of the second type and provide in at least one register, the control values for use by the first instance and second instance of the further instruction of the first type.

In some embodiments, the memory is configured to store the first part as part of the first unit of data such that at least one of a start or end of the first part is misaligned with a set of memory addresses supported for use as starting addresses for the load operations.

In some embodiments, the set of memory addresses in the memory are spaced from one another by a fixed amount, the fixed amount comprising one of: 32 bits; 64 bits; or 128 bits.

According to a second aspect, there is provided a method implemented in a data processing device comprising at least one execution unit supporting the execution of load instructions to perform load operations to load data from a memory of the processing device, the method comprising: storing in the memory, a first unit of data, the first unit of data comprising a first part and one or more additional parts; storing in a second set of one or more registers, a second unit of data; and storing in a control register, control values including: a first value indicating a starting position at which the first part is to be provided in a third unit of data; and a second value indicating the starting position of the first part in the first unit of data; and a third value indicating a length of the first part, executing at least one of the load instructions to perform a first of the load operations to load the first unit of data into a first set of one or more registers; and in response to execution of an instruction of a first type, and in dependence upon each of the control values, providing the third unit of data in a set of one or more registers with: the first part at one or more bit positions starting from the starting position indicated by the first value; and in remaining bit positions of the third unit of data, data from corresponding bit positions of the second unit of data.

In some embodiments, the method comprises: storing the second unit of data in memory; and prior to executing the instruction of the first type, in response to execution of a further at least one of the load instructions, loading the second unit of data into the second set of one or more registers.

In some embodiments, the set of one or more registers in which the third unit of data is stored is a third set of one or more registers that is different to the first set of one or more registers and the second set of one or more registers.

In some embodiments, the set of one or more registers in which the third unit of data is stored is the second set of one or more registers.

In some embodiments, the method comprises executing the instruction of the first type in order to provide the third unit of data in the second set of one or more registers such that the first part overwrites part of the second unit of data.

In some embodiments, the method comprises: prior to execution of the instruction of the first type, executing an initialisation instruction to, using one or more operands indicating a location of a buffer of data in the memory, provide the control values in the control register, wherein the buffer of data comprises the first part.

In some embodiments, the one or more operands of the initialisation instruction further indicate a location of a memory region in the memory to which the buffer of data is to be copied.

In some embodiments, the method comprises, prior to the execution of the instruction of the first type, storing the second unit of data in the memory region.

In some embodiments, the first unit of data belongs to the buffer of data.

In some embodiments, the method comprises storing in a further control register, a single value indicating: a starting position of a third part of data within a fourth unit of data; and an ending position of a fourth part of data within a fifth unit of data, wherein the method comprises: executing a further instruction of a second type to, based on the single value, provide in a set of one or more registers, a sixth unit of data, the sixth unit of data comprising: the third part of data beginning at the starting position indicated by the single value; and the fourth part of data ending at the ending position indicated by the single value.

In some embodiments, the method comprises: storing in memory a buffer of data such that at least one of a start and end of the buffer is misaligned with a set of memory addresses supported as starting addresses for the load operations; and performing a memory copy of a buffer in the memory by executing a sequence of instructions, the sequence of instructions comprising: a first instance of the instruction of the first type; a plurality of instances of the further instruction of the second type;

and a second instance of the instruction of the first type.

In some embodiments, the method comprising, prior to execution of the first instance of the instruction of the first type: executing at least one initialisation instruction to, using one or more operands indicating a location of the buffer in the memory, provide the single value in the further control register for use by at least one instance of the plurality of instances of the instruction of the second type and provide in at least one register, the control values for use by the first instance and second instance of the further instruction of the first type.

In some embodiments, the method comprises storing in the memory, the first part as part of the first unit of data such that at least one of a start or end of the first part is misaligned with a set of memory addresses supported for use as starting addresses for the load operations.

In some embodiments, the set of memory addresses in the memory are spaced from one another by a fixed amount, the fixed amount comprising one of: 32 bits; 64 bits; or 128 bits.

According to a third aspect, there is provided a computer program comprising a set of computer readable instructions which, when executed by at least one execution unit of a processing device, cause a method according to the second aspect or any embodiment therefore to be carried out. The computer readable instructions comprise load instructions, which when executed cause load operations for loading data from memory to be performed.

According to a fourth aspect, there is provided a non-transitory computer readable medium storing a computer program according to the third aspect.

BRIEF DESCRIPTION OF DRAWINGS

For a better understanding of the present disclosure and to show how the same may be carried into effect, reference will now be made by way of example to the accompanying Figures in which.

DETAILED DESCRIPTION

Embodiments are implemented in a processing device, which may take the form of a processor 4, which is described in more detail with reference to FIG. 2. In some embodiments, the processor 4 may take the form of a tile 4 of a multi-tile processing unit. An example of such a multiple tile processing unit is described in more detail in our earlier U.S. application Ser. No. 16/527,410, which is incorporated by reference.

Figure 1:
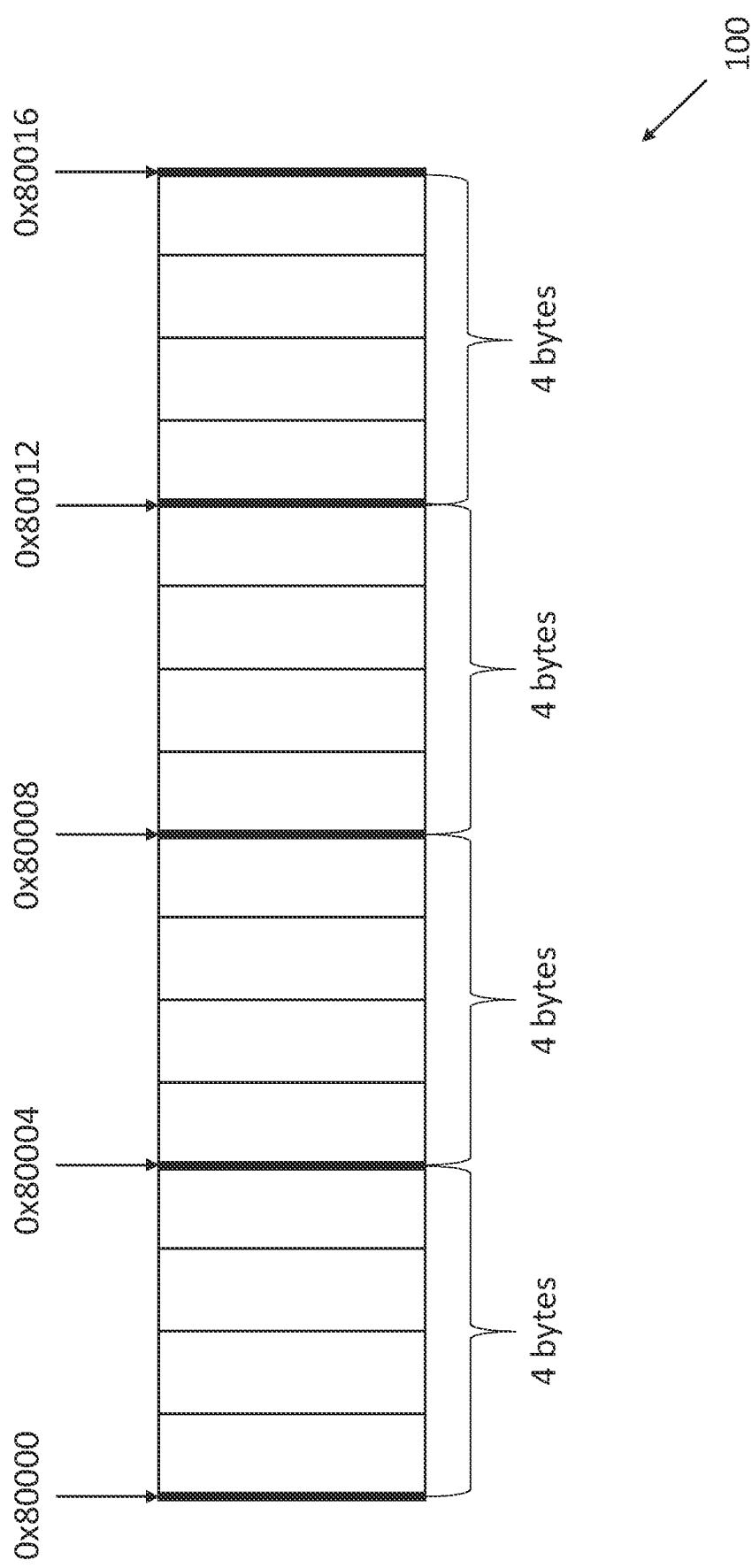
FIG. 1 illustrates the concept of aligned memory addresses.
Figure 2:
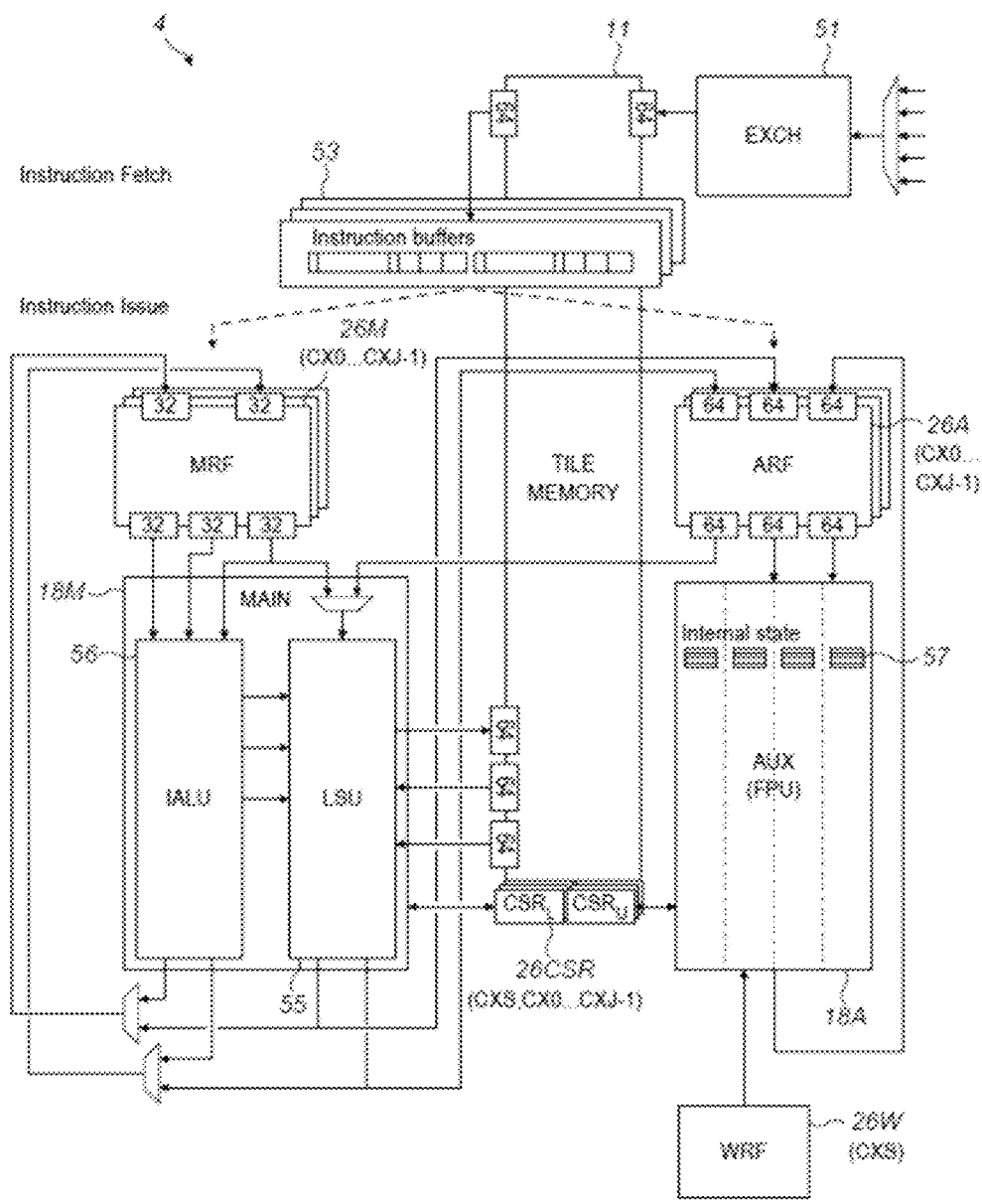
FIG. 2 illustrates a processor in which embodiments are implemented.

Reference is made to FIG. 2 illustrates an example of the processor 4 including detail of the execution unit 18 and context registers 26. The processor 4 shown includes a weights register file 26W, and so may be specially adapted for machine learning applications, in which machine learning models are trained by adjusting the weights for those models. However, embodiments of the application are not limited to machine learning applications but are more broadly applicable. Furthermore, the processor 4 described is a multi-threaded processor capable of executed M thread concurrently. The processor 4 is able to support execution of M worker threads and one supervisor thread, where the worker threads perform arithmetic operations on data to generate results and the supervisor thread co-ordinates the worker threads and control the synchronisation, sending and receiving functionality of the processor 4.

The processor 4 comprises a respective instruction buffer 53 for each of M threads capable of being executed concurrently. The context registers 26 comprise a respective main register file (MRF) 26M for each of M worker contexts and a supervisor context. The context registers further comprise a respective auxiliary register file (ARF) 26A for at least each of the worker contexts. The context registers 26 further comprise a common weights register file (WRF)

26W, which all the currently executing worker thread can access to read from. The WRF may be associated with the supervisor context in that the supervisor thread is the only thread that can write to the WRF. The context registers 26 may also comprise a respective group of control state registers 26CSR for each of the supervisor and worker contexts. The execution unit 18 comprises a main execution unit 18M and an auxiliary execution unit 18A. The main execution unit 18M comprises a load-store unit (LSU) 55 and an integer arithmetic logic unit (IALU) 56. The auxiliary execution unit 18A comprises at least a floating point arithmetic unit (FPU).

In each of the J interleaved time slots S0 . . . SJ−1, the scheduler 24 controls the fetch stage 14 to fetch at least one instruction of a respective thread from the instruction memory 11, into the respective one of the J instruction buffers 53 corresponding to the current time slot. In embodiments, each time slot is one execution cycle of the processor, though other schemes are not excluded (e.g. weighted round-robin). In each execution cycle of the processor 4 (i.e. each cycle of the processor clock which clocks the program counter) the fetch stage 14 fetches either a single instruction or a small "instruction bundle" (e.g. a two-instruction bundle or four-instruction bundle), depending on implementation. Each instruction is then issued, via the decode stage 16, into one of the LSU 55 or IALU 56 of the main execution unit 18M or the FPU of the auxiliary execution unit 18A, depending on whether the instruction (according to its opcode) is a memory access instruction, an integer arithmetic instruction or a floating point arithmetic instruction, respectively. The LSU 55 and IALU 56 of the main execution unit 18M execute their instructions using registers from the MRF 26M, the particular registers within the MRF 26M being specified by operands of the instructions. The FPU of the auxiliary execution unit 18A performs operations using registers in the ARF 26A and WRF 26W, where the particular registers within the ARF are specified by operands of the instructions. In embodiments the registers in the WRF may be implicit in the instruction type (i.e. pre-determined for that instruction type). The auxiliary execution unit 18A may also contain circuity in the form of logical latches internal to the auxiliary execution unit 18A for holding some internal state 57 for use in performing the operations of one or more of the types of floating point arithmetic instruction.

In embodiments that fetch and execute instructions in bundles, the individual instructions in a given instruction bundle are executed simultaneously, in parallel down independent pipelines 18M, 18A (shown in FIG. 2). In embodiments that execute bundles of two instructions, the two instructions may be executed simultaneously down respective auxiliary and main pipelines. In this case, the main pipeline is arranged to execute types of instruction that use the MRF and the auxiliary pipeline is used to execute types of instruction that use the ARF. The pairing of instructions into suitable complementary bundles may be handled by the compiler.

Each worker thread context has its own instance of the main register file (MRF) 26M and auxiliary register file (ARF) 26A (i.e. one MRF and one ARF for each of the barrel-threaded slots). Functionality described herein in relation to the MRF or ARF is to be understood to operate on a per context basis. However there is a single, shared weights register file (WRF) shared between the threads. Each thread can access the MRF and ARF of only its own context 26. However, all currently-running worker threads can access the common WRF. The WRF thus provides a common set of weights for use by all worker threads. In embodiments only the supervisor can write to the WRF, and the workers can only read from the WRF.

The instruction set of the processor 4 includes at least one type of load instruction whose opcode, when executed, causes the LSU 55 to load data from the data memory 22 into the respective ARF, 26A of the thread in which the load instructions was executed. The location of the destination within the ARF is specified by an operand of the load instruction. Another operand of the load instruction specifies an address register in the respective MRF, 26M, which holds a pointer to an address in the data memory 22 from which to load the data. The instruction set of the processor 4 also includes at least one type of store instruction whose opcode, when executed, causes the LSU 55 to store data to the data memory 22 from the respective ARF of the thread in which the store instruction was executed. The location of the source of the store within the ARF is specified by an operand of the store instruction. Another operand of the store instruction specifies an address register in the MRF, which holds a pointer to an address in the data memory 22 to which to store the data. In general the instruction set may include separate load and store instruction types, and/or at least one load-store instruction type which combines the load and store operations in a single instruction.

In response to the opcode of the relevant type of arithmetic instruction, the arithmetic unit (e.g. FPU) in the auxiliary execution unit 18A performs an arithmetic operation, as specified by the opcode, which comprises operating upon the values in the specified source register(s) in the threads' respective ARF and, optionally, the source register(s) in the WRF. It also outputs a result of the arithmetic operation to a destination register in the thread's respective ARF as specified explicitly by a destination operand of the arithmetic instruction.

It will be appreciated that the labels "main" and "auxiliary" are not necessarily limiting. In embodiments they may be any first register file (per worker context), second register file (per worker context) and shared third register file (e.g. part of the supervisor context but accessible to all workers). The ARF 26A and auxiliary execution unit 18 may also be referred to as the arithmetic register file and arithmetic execution unit since they are used for arithmetic instructions (or at least the floating point arithmetic). The MRF 26M and auxiliary execution unit 18 may also be referred to as the memory address register file and arithmetic execution unit since one of their uses is for accessing memory. The weights register file (WRF) 26W is so-called because it is used to hold multiplicative weights used in a certain type or types of arithmetic instruction, to be discussed in more detail shortly. E.g. these could be used to represent the weights of nodes in a neural network.

Seen another way, the MRF could be called the integer register file as it is used to hold integer operands, whilst the ARF could be called the floating-point register file as it is used to hold floating-point operands. In embodiments that execute instructions in bundles of two, the MRF is the register file used by the main pipeline and the ARF is the register used by the auxiliary pipeline.

In alternative embodiments however, note that the register space 26 is not necessarily divided into these separate register files for these different purposes. Instead instructions executed through the main and auxiliary execution units may be able to specify registers from amongst the same shared register file (one register file per context in the case of a multithreaded processor). Also the pipeline 13 does not necessarily have to comprise parallel constituent pipelines (e.g. aux and main pipelines) for simultaneously executing bundles of instructions.

The processor 4 may also comprise an exchange interface 51 for exchanging data between the memory 11 and one or more other resources, e.g. other instances of the processor and/or external devices such as a network interface or network attached storage (NAS) device. As discussed above, in embodiments the processor 4 may form one of an array 6 of interconnected processor tiles, each tile running part of a wider program. The individual processors 4 (tiles) thus form part of a wider processor or processing system 6. The tiles 4 may be connected together via an interconnect subsystem 34, to which they connect via their respective exchange interface 51. The tiles 4 may be implemented on the same chip (i.e. die) or on different chips, or a combination (i.e. the array may be formed from multiple chips each comprising multiple tiles 4). The interconnect system 34 and exchange interface 51 may therefore comprise an internal (on-chip) interconnect mechanism and/or external (inter-chip) exchange mechanism, accordingly.

As noted, the LSU 55 is able to execute load and store instructions to load and store units of data to and from the tile memory 11. These operations are subject to the architectural constraint that the load and store instruction operations may only performed at aligned memory addresses. These aligned memory addresses may be multiples of 32 bits, 64 bits, 128 bits or another number of bits dependent upon the instruction set architecture. As a consequence, some of the data to be loaded from the memory 11 may be misaligned, meaning that at least one of the boundaries (the start and/or end) of the data does not fall on an aligned memory address. As a result any load operations to load the data will necessarily involve loading additional data from the memory 4

According to embodiments of the application, the processor 4 may execute load instructions to load data from the memory into registers (e.g. registers belonging to an ARF 26A) of the processor 4. In particular, a first load instruction is executed to load a first unit of data into a first set of one or more registers, and a second load instruction is executed to a load a second unit of data into a second set of one or more registers. The processor 4 then executes a pack instruction to cause a third unit of data to be formed in the registers, where the third unit of data comprises a first part from the first unit of data and data from corresponding bit positions of the second unit of data. The first part of data is provided at a location in the third unit of data indicated by control values for the pack instruction, enabling the data to be place as required. This may be used for memory copies, where the pack instruction is used along with the extract instruction to copy a buffer of data spanning a range of memory addresses that cannot be accessed using a single load instruction, or may be used to align part of a unit of data at the start of a set of registers for being operated on by arithmetic operations.

Each of the units of data (i.e. the first unit of data, second unit of data, and third unit of data) discussed herein may also be referred to as an atom. Each atom/unit of data represents an amount of data that would be loaded in a single load operation or stored in a single store operation. In the embodiments described, each such atom is 128 bits in size. Each such load and store operation is performed in response to a load instruction or a store instruction. The load instructions used to perform the load instructions as described may be double-load instruction, where two load operations are performed in response to execution of the same double-load instruction. Likewise, the store instructions used to perform the store instruction as described may be double-store instructions, wherein two store operations are performed in response to execution of the same double-store instruction.

A second type of instruction, which may be used in conjunction with the pack instruction is also described herein. The pack instruction operates to provide the third unit of data being the same as the second unit of data, except from at a certain number of bit positions in the third unit of data at which part of the first unit of data is inserted. On the other hand, the second type of instruction, which is referred to as the "extract instruction", operates to provide a resulting unit of data, where that resulting unit of data consists of data extracted from an input unit of data until a specified pivot point, following which the resulting unit of data consists of data extracted from a further input unit of data. As will be described, when performing a memory copy of a buffer of data from one memory location to another, both the pack instruction and the extract instruction are executed as part of the memory copy process.

In the description below, reference is made to instructions being executed and operations being performed by an execution unit. However, the different instructions need not be executed by the same execution unit. In embodiments, the load and store instructions are executed by the LSU 55, whereas the pack and extract instructions are executed by an execution unit of the auxiliary pipeline 18A. Reference below to operations being performed by an execution unit should, unless stated as being performed by a specific execution unit, be construed as referring to operations being performed by one or more execution units or at least one execution unit of a processor, e.g. processor 4.

Figure 3:
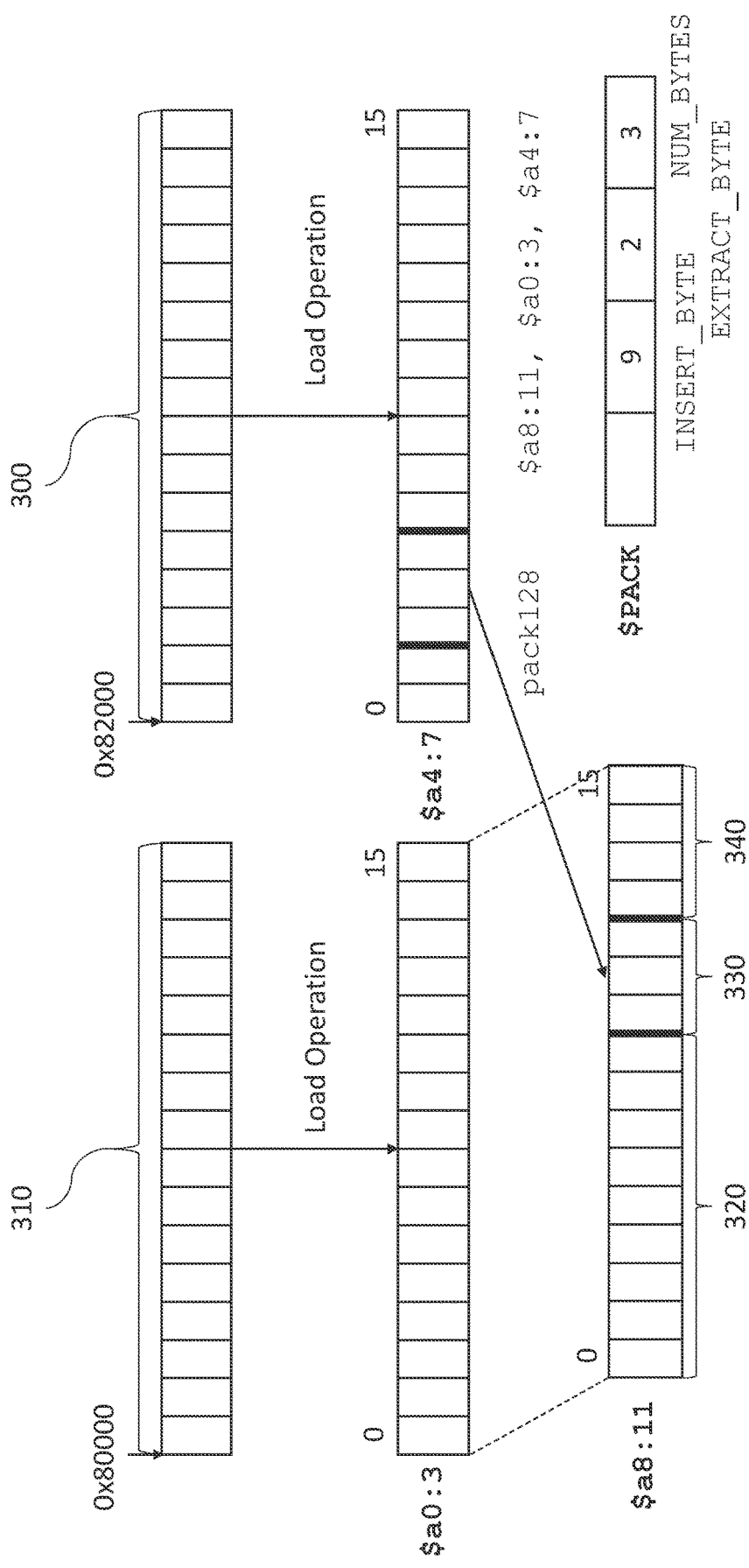
FIG. 3 illustrates an example use of the provision of a unit of data in response to execution of the pack instruction.

Reference is made to FIG. 3, which illustrates an example of the operation of the pack instruction. FIG. 3 shows a first unit of data 300 stored in memory, and a second unit of data 310 also stored in memory at a different location. In the example, the first unit of data 300 is stored in a portion of memory starting at memory location 0x82000, whilst the second unit of data 310 is stored in a portion of memory starting at memory location 0x80000.

The processor 4 executes load instructions to load the units of data into registers. Each of these load instructions is executed by the LSU 55. A first of the load instructions is executed to load the first unit of data 300 into a first set of registers (shown as $a4:7). A second of the load instructions is executed to load the second unit of data 310 into a second set of registers (shown as $a0:3).

Once both units of data are loaded into the registers, the pack instruction is executed by the processor 4 to provide the third unit of data in another set of registers (shown as $a8:11). The pack instruction is executed by an execution unit of the Auxiliary pipeline 18A of the processor. The pack instruction takes a number of operands, which identify the registers. Specifically, a first operand identifies the destination registers ($a8:11 in this example) into which the third unit of data is to be stored. A second operand identifies the source registers ($a0:3 in this example) in which the second unit of data is stored. A third operand identifies the source registers ($a4:7 in this example) in which the first unit of data is stored.

In addition to the operands, the pack instruction makes use of a number of values held in a control register, which is referred to herein as the $PACK register. These values indicate (amongst other things) a starting position of a first part of data belonging to the first unit of data that is to be included in the third unit of data and an ending position of a second part of data belonging to the second unit of data that is also to be included in the third unit of data. The values in the $PACK register include a first value specifying the starting position in the destination registers at which the first part of data is to be written. This first value is shown in FIG. 3 as "INSERT_BYTE" and takes the value of 9 in the example of FIG. 3. The values in the $PACK register include a second value specifying the starting position of the first part of data in the source registers containing the first unit of data. This second value is shown in FIG. 3 as "EXTRACT_BYTE" and takes the value of 2 in the example of FIG. 3. The values in the $PACK register include a third value specifying the size (i.e. the number of bytes) of the first part of data. This third value is shown in FIG. 3 as "NUM_BYTES" and takes the value of 3 in the example of FIG. 3.

When the pack instruction is executed by the execution unit of the processor 4, using the values from the $PACK register, it causes the second unit of data to be copied into the destination registers and causes part of the second unit of data in the destination registers to be overwritten with the first part of data from the first unit of data. The result is shown in FIG. 3. Shown in the destination register is the second part of data 320 taken from the second unit of data, and the first part of data 330 taken from the first unit of data. In this example, the destination registers also include a further part of data 340 taken from the second unit of data.

It would be appreciated that the pack instruction can be used to move a part of data to a new location within an atom of data. This may be useful in the case that it is required to process the first part of data 330 and the second part of data 320 together. For example, a particular set of arithmetic operations may operate on these two parts of data 320, 330. Given that the size of load and store instructions is restricted to a minimum size, aligning these parts of data 320, 330 together in the destination registers may not be possible (e.g. if the boundaries of the first part of data and the end position of the second part of data are not aligned in memory with the boundaries from which load operations may be performed).

Once the third unit of data is provided in the destination register, this third unit of data may immediately be operated on by arithmetic operations or may be stored back to memory 11 before being subject to any processing.

In FIG. 3, the pack instruction is shown as pack128, which is version of the pack instruction for which the first and second units of data that are operated on and the third unit of data that results are each 128 bits in length. However, different versions of the pack instruction operating on different sized units of data may also be provided. In particular, in embodiments, as part of the processor's 4 instruction set, there is provided a version of the pack instruction (referred to as pack32) that operates on units of data that are each 32 bits in length, and a version of the pack instruction (referred to as pack64) that operates on units of data that are each 64 bits in length.

Figure 4:
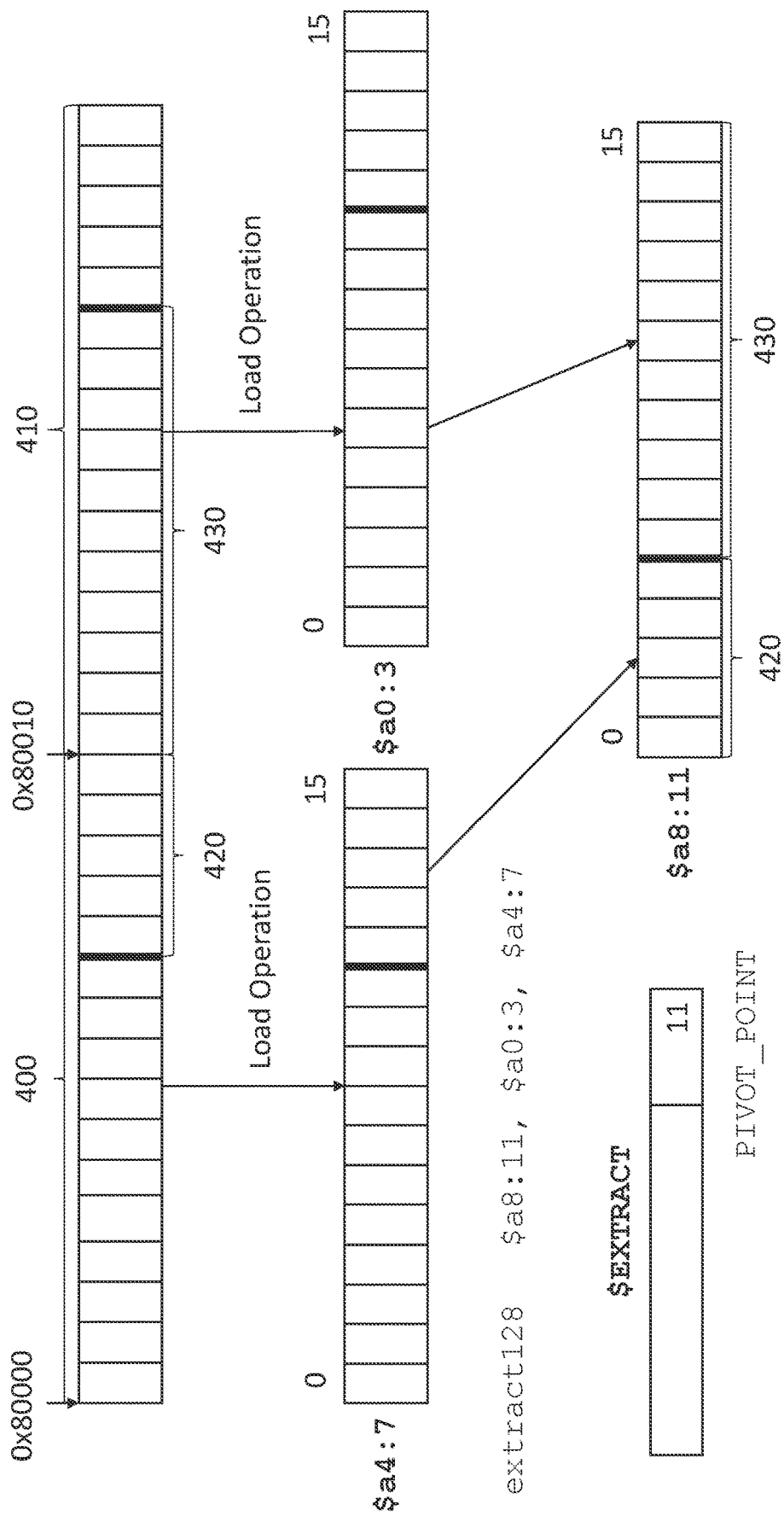
FIG. 4 illustrates an example use of the provision of a unit of data in response to execution of the extract instruction.

Reference is made to FIG. 4, which illustrates an example of the operation of the extract instruction. FIG. 4 shows a first unit of data 400 stored in memory, and a second unit of data 410 also stored in memory at a different location. In the example, the first unit of data 400 is stored at memory location 0x80000, whilst the second unit of data 410 is stored at memory location 0x80010. As shown, in this case, the first unit of data 400 and the second unit of data 410 are stored contiguously in memory. The extract instruction is useful for extracting parts of data and combining them together in the case that those parts of data are not aligned with the boundaries of the units of data that may be accessed by load and store instructions. As shown, the first unit of data 400 comprises a first part of data 420, whilst the second unit of data 410 comprises a second part of data 430.

Prior to execution of the extract instruction, the LSU 55 performs two load operations, a first of which loads the first unit of data 400 into a first set of registers (shown as $a4:7) and a second of which loads the second unit of data 410 into a second set of registers (shown as $a0:3).

Once both units of data are loaded into the registers, the extract instruction is executed by the processor 4 to provide the third unit of data in another set of registers (shown as $a8:11). The extract instruction is executed by an execution unit of the Auxiliary pipeline 18A of the processor. The extract instruction takes a number of operands, which identify the registers. Specifically, a first operand identifies the destination registers ($a8:11 in this example) in which the third unit of data is to be stored. A second operand identifies the source registers ($a0:3 in this example) in which the second unit of data 410 is stored. A third operand identifies the source registers ($a4:7 in this example) in which the first unit of data 400 is stored.

In addition to the operands, the extract instruction makes use of a value in a control register, which is referred to herein as the $EXTRACT register. The value in the $EXTRACT register specifies both the start position of the first part of data 420 in the first unit of data 400 and the end position of the second part of data 430 in the second unit of data 410. Since the third unit of data that results from execution of the extract instruction consists entirely of the first part of data 420 and the second part of data 430, the same value (referred to herein as the "pivot point") may be used to specify both of these start and end positions. In FIG. 4, the value is shown as "PIVOT_POINT" and takes the value of 11, thereby specifying that the relevant start and end positions are at the start of byte 11 in each of the sets of source registers for the extract instruction.

When the extract instruction is executed by the execution unit of the processor 4, using the value in the $EXTRACT register it copies the first part of data 420 from the source registers containing the first unit of data 400 to a part of the destination registers. Additionally, in response to execution of the extract instruction, the second part of data 430 is copied from the source registers containing the second unit of data 410 to part of the destination registers. As shown, the execution unit of the processor 4 causes the second part of data 430 to be stored in a second part of the destination registers. Additionally, the execution unit of the processor 4 causes the first part of data 420 to be stored in a first part of the destination registers, where the second part of the destination register follows the first part of the destination registers. In this way, the position of each of the parts 420, 430 in the set of destination registers is reversed with respect to their positions in the sets of source registers. The first part of data 420 is stored at the end (i.e. in the least significant bits) of the set of source registers containing the first unit of data 400, whilst being stored at the start (i.e. in the most significant bits) of the set of destination registers. The second part of data 430 is stored at the start (i.e. in the most significant bits) of the source registers containing the second unit of data 410, whilst being stored at the end (i.e. in the least significant bits) of the set of destination registers.

Once the third unit of data is provided in the destination register, this third unit of data may immediately be operated on by arithmetic operations or may be stored back to memory 11 before being subject to any processing.

In FIG. 4, the extract instruction is shown as extract128, which is version of the extract instruction for which the first and second units of data that are operated on and the third unit of data that results are each 128 bits in length. However, different versions of the extract instruction operating on different sized units of data may also be provided.

In FIGS. 3 and 4, examples are provided in which all three sets of the registers (i.e. the two source sets of registers and the destination set of registers) specified by the relevant instruction are different. However, in some examples one of the source sets of registers may be the same as the destination set of registers, with the effect of the execution of the instruction being to overwrite some of the data in the source set of registers. Such an example is presented for the pack instruction in FIG. 6.

The extract instruction may be particularly useful when used for performing a memory copy of a buffer from one part of memory (at which the buffer is not aligned with the boundaries of memory access) to another part of memory, in the case that that buffer comprises a number of atoms of data.

An example will now be described, with respect to FIGS. 5A to 5H of a memory copy on a misaligned buffer of data that makes use of both the pack and extract instructions. In order to perform this memory copy, it is described how initialisation instructions, using certain parameters relating to the copy, may be executed beforehand by an execution unit of the processor 4 prior to executing the pack and extract instructions to perform the re-arrangement of the loaded data in the registers.

Figure 5A:
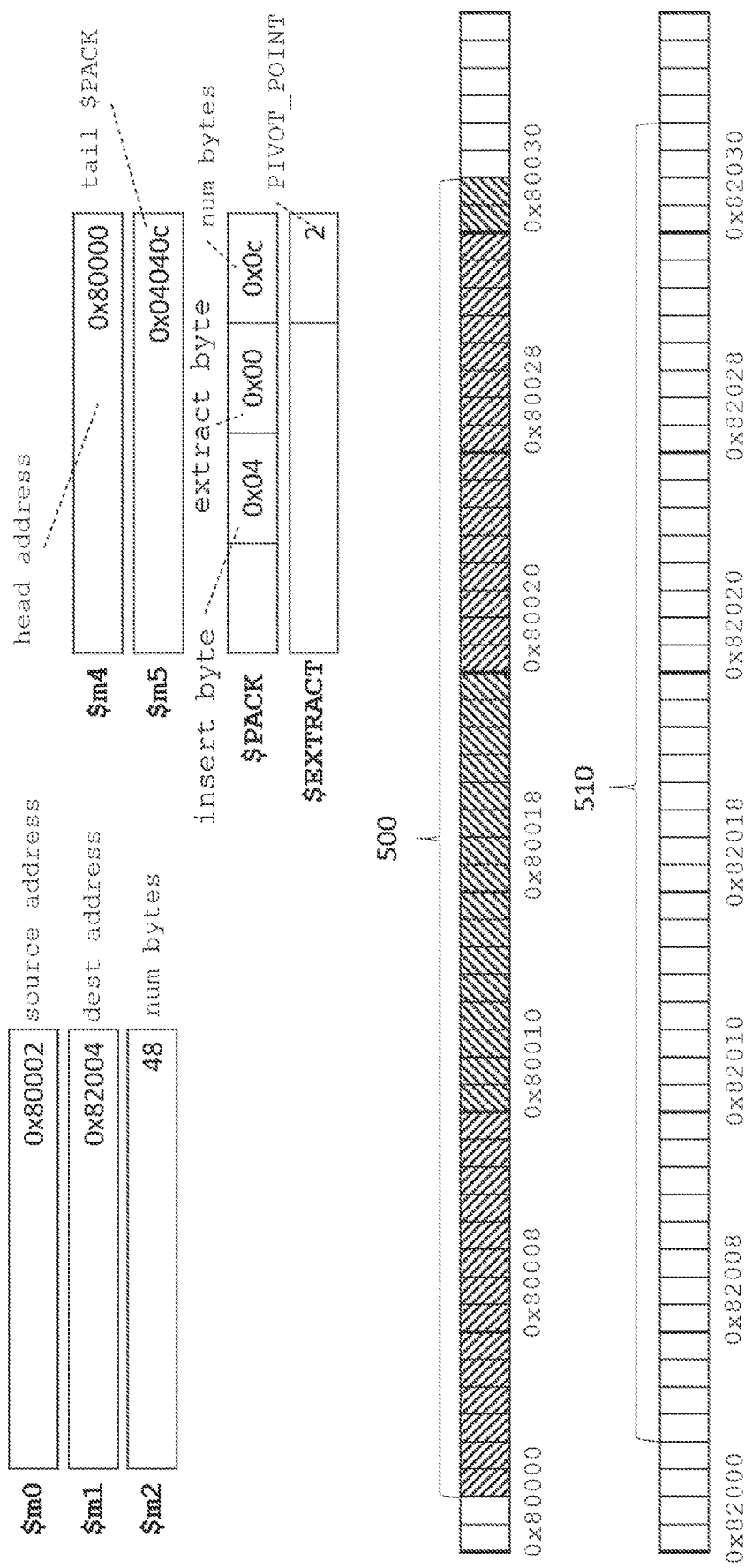
FIG. 5A illustrates the state of registers and memory following execution of a first initialisation instruction.

Reference is made to FIG. 5A, which illustrates a portion of memory 11 (which may be referred to as the source memory) from which is to be copied a buffer of data 500. The buffer 500 is to be copied to another portion of memory 11 (referred to herein as the destination memory). Although the source memory and destination memory are each referred to as being "memories" they may form part of the same memory unit or memory bank.

The buffer 500 is to be copied to a memory region 510 in the destination memory, which is the same size as the buffer 500. Since the load and store operations are limited to accessing data of minimum sizes (which may be 128 bits or 64 bits, for example), it is seen that the boundaries of both buffer 500 and memory region 510 are not aligned with the memory access boundaries. As a result, two of the load operations performed to load the data of buffer 500 will also load some data (which it is not desired to copy to the memory region 510). Furthermore, two of the store operations performed to store data of buffer 500 to memory region 510 will also store some data (other than data of the buffer 500) to the memory region 510. The pack and extract instructions may be used together to handle this situation by loading some data from the destination memory and combining this together with the data of buffer 500 to form the appropriate data to be stored to the destination memory, with the end result being that the only new data stored to the destination memory is data from the buffer 500.

Prior to execution of the pack and extract instructions, a first initialisation instruction (referred to as init128headtail) is executed. This init128headtail instruction populates registers that are used for providing the first and the final atoms of data to be stored to the destination memory. The first atom may be referred to as the "head" atom, whilst the final atom may be referred to as the "tail" atom. These registers include the $PACK register, which is populated with control values used when the first pack instruction is executed. The registers also include the $EXTRACT register, which is populated with a control value used when the first extract instruction is executed. The registers also include a register (shown as $m5) that include the control values to be used when the second (and final) pack instruction is executed. The registers also include a register (shown as $m4) in which the address (referred to as the head address) for the first load operation for loading data from the source memory is performed.

The init128headtail instruction has a number of operands that are used for providing control register values. A first of these is the starting address of the buffer 500. In the example of FIG. 5A, this is equal to 0x80002 and is located in register $m0. A second of the operands is the starting address of the memory region 510. In the example of FIG. 5A, this is equal to 0x82004 and is located in register $m1. A third of the operands is the size of buffer 500. In the example of FIG. 5A, this size is equal to 48 bytes and is located in register $m2.

In response to the execution of the init128headtail instruction, the execution unit determines the pivot value for the $EXTRACT register by determining how many bytes the source address (i.e. 0x80002 in this example) is displaced from the preceding aligned memory address (0x80000 in this example). This preceding aligned memory address is the starting address at which the first load operation to load the first part of buffer 500 would be performed. In this example, the pivot value determined by the extract instruction and stored in the $EXTRACT register is equal to two bytes.

Additionally, in response to the execution of the init128headtail instruction, the execution unit determines the first control value (i.e. insert byte) to be stored in the $PACK register. The execution unit determines the first control value (i.e. insert byte) by determining how many bytes the source destination (i.e. 0x82004 in this example) is displaced from the preceding aligned memory address (0x82000 in this example). This preceding aligned memory address is the starting address at which the first store operation to store a unit of data containing part of the buffer 500 to the destination memory would be performed. In this example, the insert byte value determined by the extract instruction and stored in the $PACK register is equal to four bytes.

The execution unit, in response to execution of the init128headtail instruction, sets the second control value (i.e. the extract byte) to be equal to zero. This value is set to zero for a memory copy of a buffer, since the data to be inserted will start from the beginning of a set of registers containing only data of the buffer 500. As will be described, the data is provided in this set of registers by execution of the first extract instruction.

The execution unit, in response to execution of the init128headtail instruction, sets the third control value (i.e. num bytes) to be equal to the amount of data of buffer 500 that will be stored to the destination memory in the first store operation. This is represented visually as being the part of memory region 510 that falls within the first atom of destination memory (i.e. between addresses 0x82000 to 0x82010). Therefore, in the example of FIGS. 5A to 5H, the third control value is the number of bytes between the destination address value specified in $m1, i.e. 0x82004, and the next aligned memory address in the destination memory, i.e. 0x82010. The third control value in the example of FIG. 5A to 5F is equal to 12 bytes.

As noted, the execution unit, in response to execution of the init128headtail instruction, determines the pack control values for the second (and final) pack instruction. These are shown as labelled as tail $PACK in FIG. 5A and referred to below as the second pack control values.

In response to execution of the init128headtail instruction, the execution unit determines the first control value (i.e. the insert byte) of the second pack control values. The execution unit determines this first control value by determining the number of bytes of the memory region 510 that are present in the last unit of data to be stored to the destination memory. These number of bytes are the number of bytes of the buffer 500 that will be stored in this last unit of data in the destination memory. In the example of FIG. 5A, the last atom of data starts at address 0x82030. The end of memory region 510—which the execution unit may determine by adding the number of bytes (i.e. 48) from $m2 to the memory region 510 starting address (i.e. 0x82004) from $m1—is at 0x82034. By subtracting the end of memory region from the aligned memory address preceding that address (i.e. 0x82030), the execution unit may determine the number of bytes (i.e. 4) representing the first control value of the second pack control values.

In response to execution of the init128headtail instruction, the execution unit determines the second control value (i.e. extract byte) of the second pack control values. The execution unit sets this value to the same value as the value of the first control value (i.e. 4 bytes in the example given).

In response to execution of the init128headtail instruction, the execution unit determines the third control value (i.e. num bytes) of the second pack control values. The execution unit sets this value to be equal to the size (i.e. 16 bytes in the example) of the units of data that are loaded in each load operation minus the value (i.e. 4 bytes in the example) of the first and second control values of the second pack control values. This represents the amount of data loaded from the destination memory that will be written back to the destination memory in the last store operation (i.e. the store operation starting from memory address 0x82030). This value is equal to 12 bytes in the example.

Figure 5B:
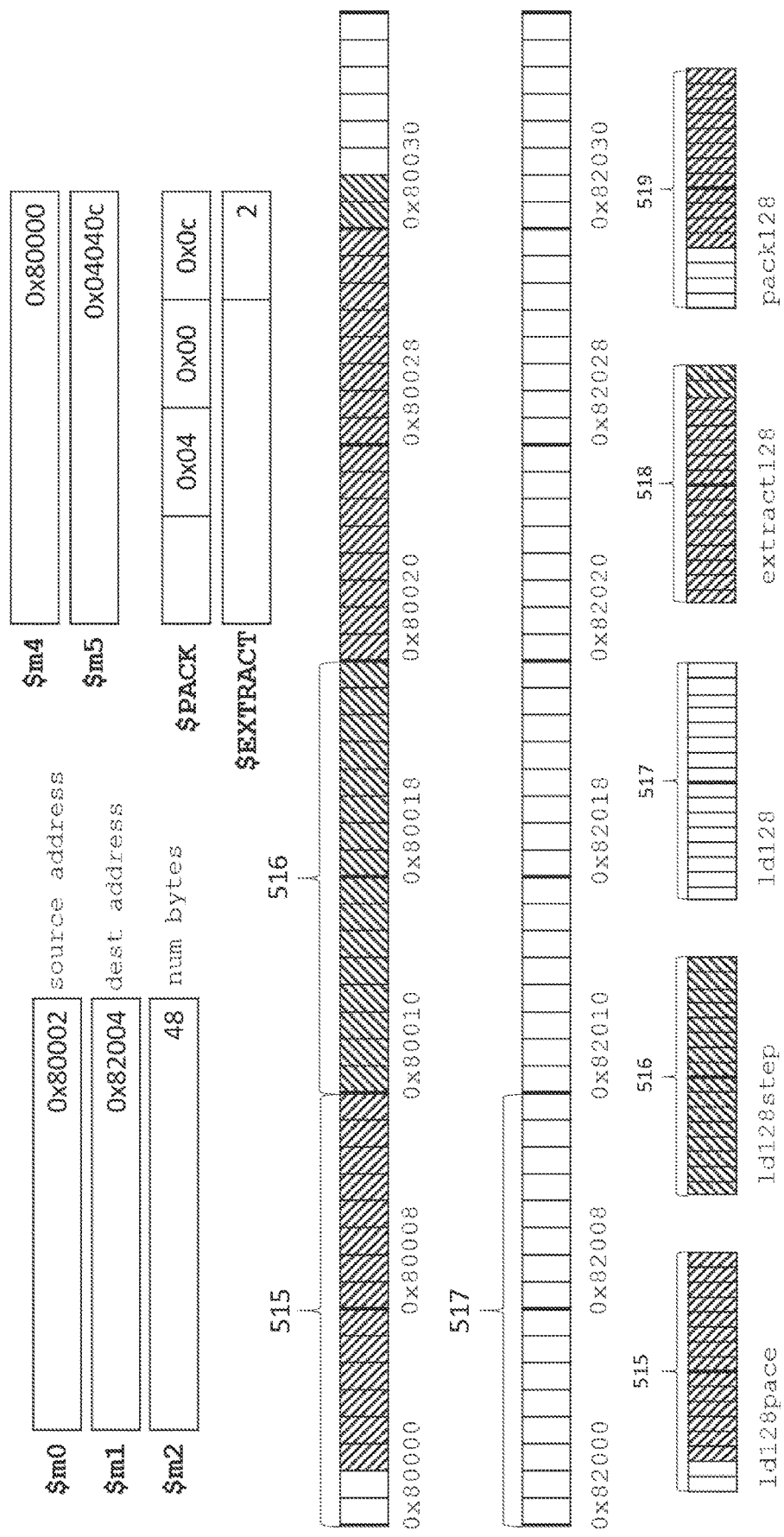
FIG. 5B illustrates the updates to the state of registers in response to execution of load instructions, a first extract instruction and a first pack instruction.

Reference is made to FIG. 5B, which illustrates the operations performed after execution of the init128headtail instruction. The execution unit executes a first load instruction (shown as ld128pace) to load the unit of data 515 from the source memory into a set of registers. The execution unit executes a second load instruction (shown as ld128step) to load the unit of data 516 from the source memory into a further set of registers. The execution unit executes a third load instruction (shown as ld128) to load the unit of data 517 from the destination memory into another set of registers.

Having loaded the data, the execution unit executes an extract instruction (shown as extract128 in FIG. 5B). This instance of the extract instruction is executed with a first operand specifying the first source set of registers into which the unit of data 516 has been loaded and a second source operand specifying the set of registers into which the unit of data 515 has been loaded. Since the pivot point specified in the $EXTRACT register takes a value of two, the execution unit causes the first two bytes of the unit of data 516 to be stored in a set of destination registers and the bytes of the unit of data 515 after the first two bytes of that unit 515 to be stored in the same set of destination registers. In other words, the execution unit, in response to the extract instruction, uses the pivot point to take the n−2 most significant bytes of unit 515 and combine them with the least significant two bytes of unit 516 to provide the full n bytes of unit 518. The resulting unit of data 518 from the execution of this extract instruction is shown in FIG. 5B. As shown the unit of data 518 consists of data from the first unit 515, except for the final two bytes of unit of data 518, which are the first two bytes of the second unit 516. This resulting unit of data 518 is the first full data unit of the buffer 500.

After obtaining the unit of data 518, the execution unit executes a pack instruction (shown as pack128 in FIG. 5B). The pack instruction takes as a first operand specifying as a source set of registers, the registers containing the unit of data 518 and a second operand specifying as a source set of registers, the registers containing the unit of data 517. The result of execution of this pack instruction is that the unit of data 517 is copied into the destination set of registers for the pack instruction, with part of that data then being overwritten by data from the unit of data 518. Given the extract value of zero in the $PACK register, the execution unit causes data starting from the beginning of data unit 518 to written to the destination set of registers. Given the insert value of 0x04 in the $PACK register, the execution unit causes the extracted data to be written into the destination set of registers starting from an offset of four bytes from the start of the destination set of registers. Given the number of bytes value of 12 (0x0c in hexadecimal), the execution unit causes 12 bytes of the data unit 518 to be written to the destination set of registers. The resulting unit of data 519 held in the set of destination registers is shown in FIG. 5B. This unit of data 519 resulting from the execution of the first pack instruction constitutes the first unit of data 519 to be stored to the destination memory.

Figure 5C:
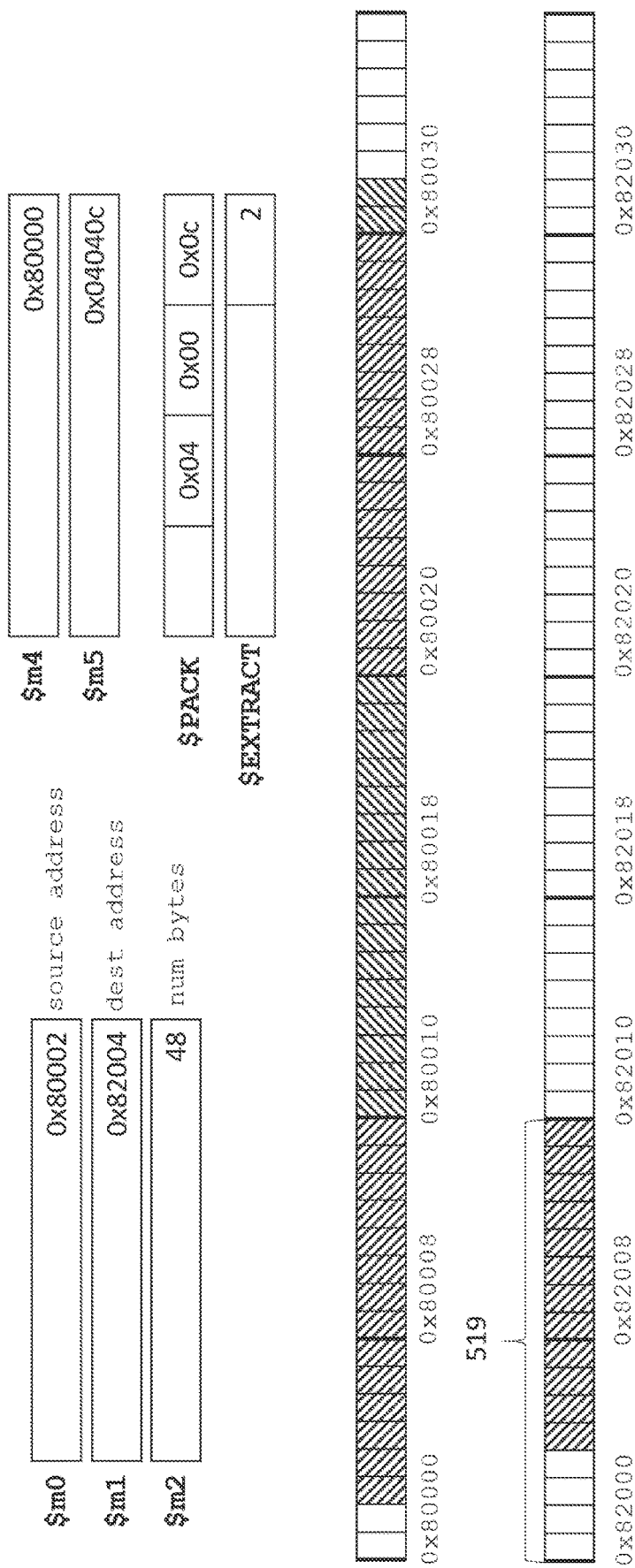
FIG. 5C illustrates the update to the state of memory in response to execution of a store instruction.

Reference is made to FIG. 5C, which illustrates how the unit of data 519 may be stored back to memory. In particular, the execution unit executes a store instruction (shown as st128) to store the unit of data 519 to the destination memory. The store instruction takes an operand specifying the aligned memory address (i.e. 0x82000) for the first atom of data to be stored to the destination memory as part of the memory copy. As shown, the load operation causes the unit of data 519 to be stored starting from the memory address of 0x82000.

Figure 5D:
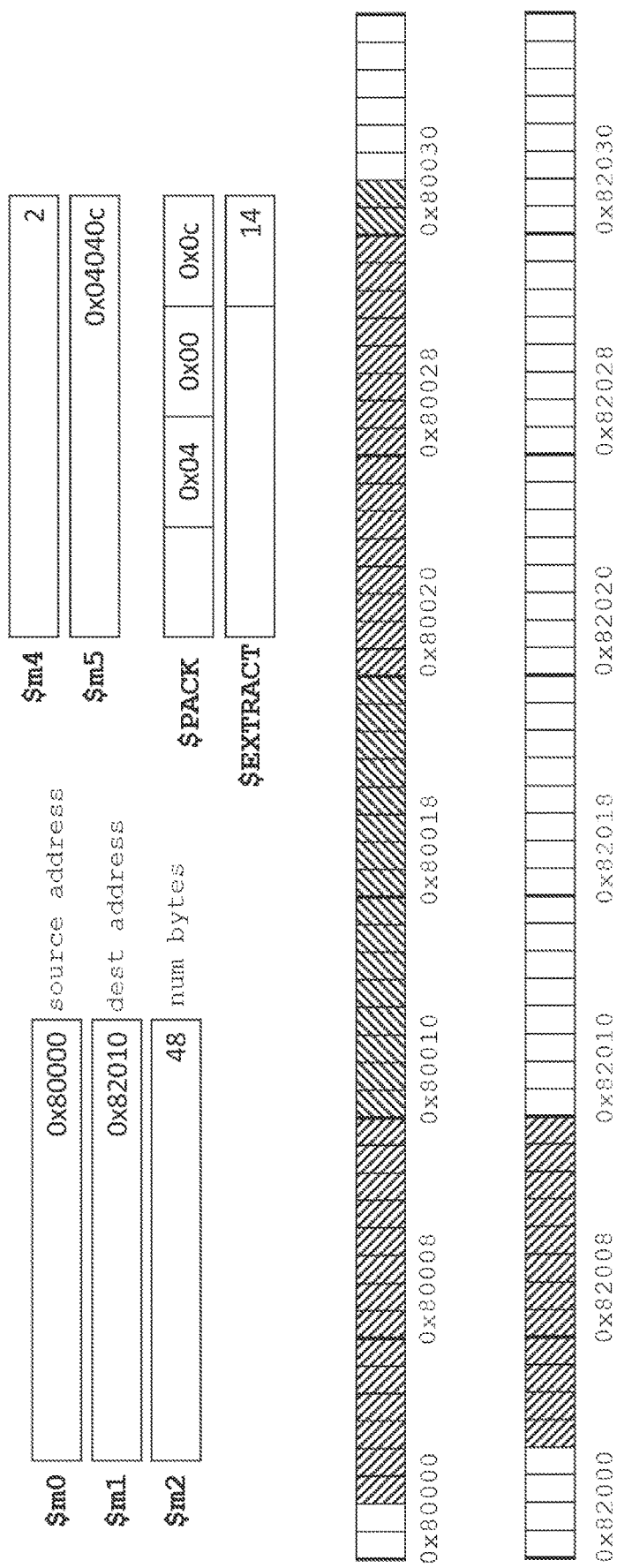
FIG. 5D illustrates the state of registers and memory following execution of a second initialisation instruction.

Reference is made to FIG. 5D, which illustrates how a second initialisation instruction (referred to an init128body) may be executed to load into registers, values for handling the operations to produce the units of data to be located between the two end units of data in the destination memory. These units of data between the two end of units of data may be referred to as the body section of the buffer 500.

The init128body instruction causes the value held in the $EXTRACT control register to be modified. This value is modified to enable the extract operations used to produce the units of data forming the body section of the buffer 500 when stored to memory region 510. In response to execution of the init128body instruction, the execution unit determines the new pivot value by subtracting the previous value (i.e. two bytes in the example) held in the $EXTRACT control register (which was determined by executing the init128headtail) from the number of bytes of each data unit (i.e. 16 bytes in the example). The resulting value (i.e. 14 bytes) in the example is stored in the $EXTRACT control register in place of the former pivot value that was used for the first extract instruction.

In response to execution of the init128body instruction, the execution unit determines the number of atoms of data belonging to the body section of the buffer 500. This number equates to the number of store operations required to be performed to store the body section of buffer 500 to the destination memory. The body section of the buffer 500 consists of the data of the buffer 500 to be stored to destination memory, other than the data of buffer 500 that is stored to destination memory in the first atom (i.e. atom 519) or the data of buffer 500 that is stored to destination memory in the final atom (i.e. the atom starting at memory address 0x80030). The body section of the buffer 500 in the example of FIGS. 5A to 5H is located between memory address 0x82010 and 0x82030 and consists of two atoms of data.

In response to the execution of the init128body instruction, the execution unit determines the memory address for the first load operation to be performed to the source memory for determining the body of the buffer 500. This memory address (i.e. 0x80000 in the example) is shown as being stored to $m0 in the example. Additionally, the execution unit determines the memory address for the first store operation for the body of buffer 500 (which follows the store operation of unit of data 519) to the destination memory. This memory address (i.e. 0x82010 in the example) is shown as being held in $m1 in the example.

Figure 5E:
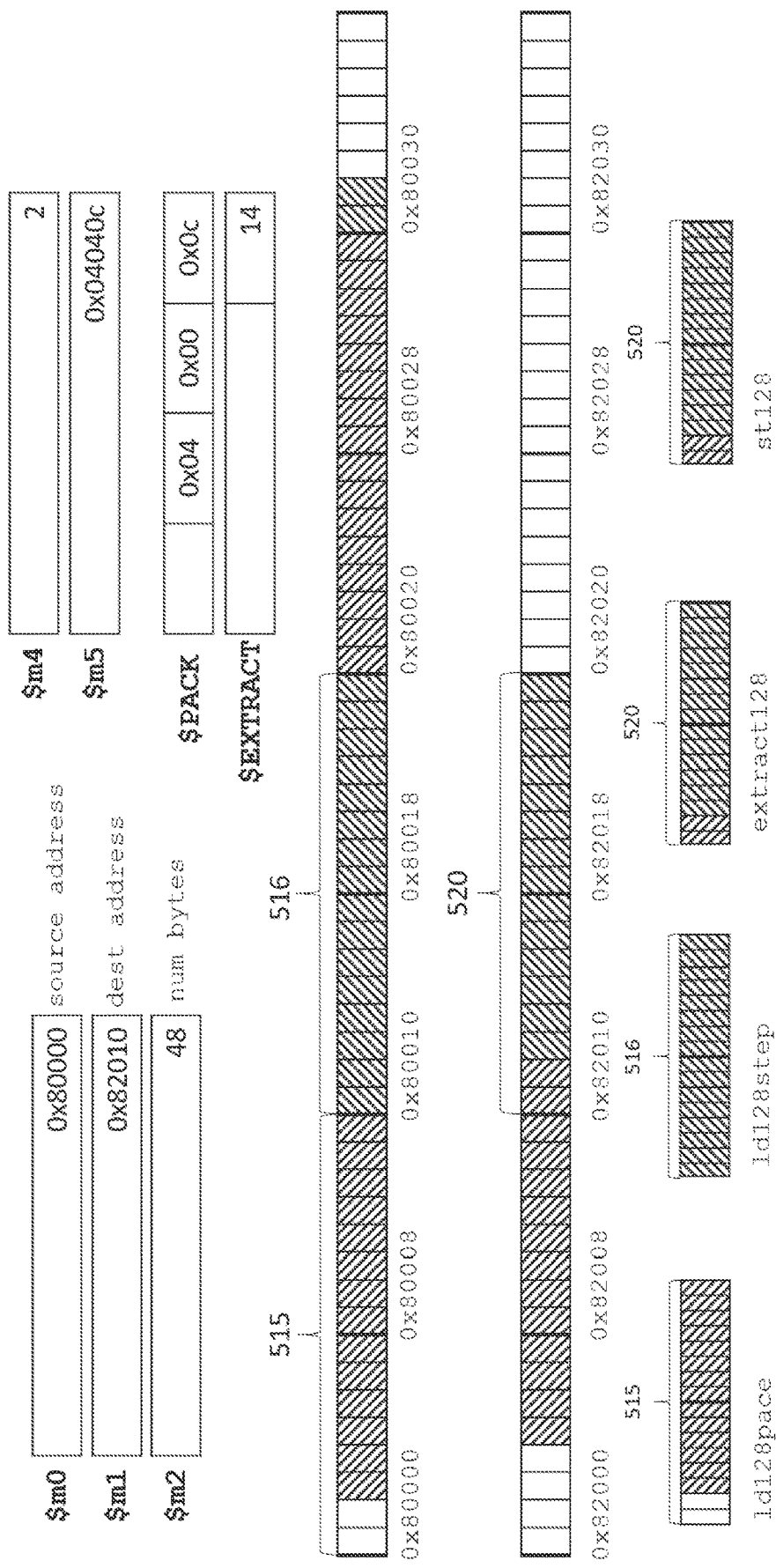
FIG. 5E illustrates the updates to the state of registers and memory in response to execution of load instructions, a second extract instruction, and a store instruction.

Reference is made to FIG. 5E, which illustrates, the operations performed by the processor 4 after execution of the init128body instruction. The execution unit executes a first load instruction (shown as ld128pace) to load the data unit 515 from the source memory and a second load instruction (also shown as ld128pace) to load the data unit 516 from the source memory. Since these same data units 515, 516 are loaded from the source memory for providing the head data unit 517, in some embodiments, these data units 515, 516 are not loaded again following the execution of init128body, but may be retained in the sets of registers into which they were loaded previously for constructing the head data unit 517.

Having loaded the data, the execution unit executes an extract instruction (shown as extract128 in FIG. 5E). This instance of the extract instruction is executed with a first operand specifying the set of registers into which the unit of data 516 has been loaded as a first source set of registers and a second operand specifying the set of registers into which the unit of data 515 has been loaded as a second source set of registers. Since the pivot point specified in the $EXTRACT register takes a value of 14, the execution unit provides a unit of data 520. The unit 520 comprises bytes of the unit of data 515 after the first 14 bytes of data of the unit 515 (in other words the last two units). The unit 520 also comprises the first 14 bytes of data 516. The 14 bytes taken from unit 516 follow the two bytes taken from unit 515 in the unit of data 520. The execution unit provides the unit of data 520 in a set of destination registers that are identified by an operand of the extract instructions. The unit of data 520 stored in these destination registers forms the first atom of the body of the buffer 500.

After providing the unit of data 520, the execution unit executes a store instruction to store the unit of data 520 to memory. The unit of data 520 is stored at the aligned memory address that is the next aligned memory address following the address at which the unit of data 519 is stored.

Figure 5F:
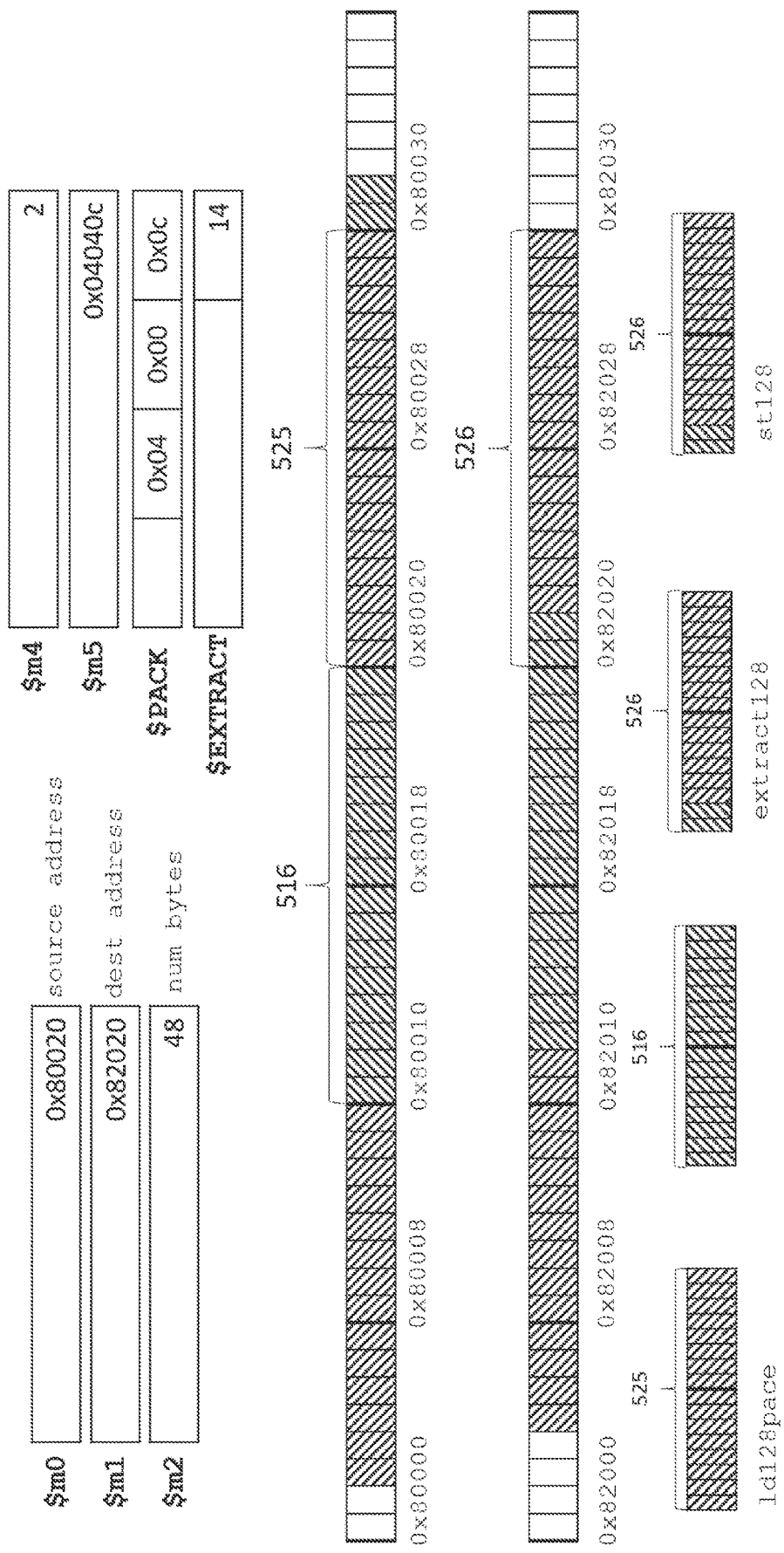
FIG. 5F illustrates the updates to the state of registers and memory in response to execution of a load instruction, and a third extract instruction, and a store instruction.

Reference is made to FIG. 5F, which illustrates how the second atom of data for the body of the buffer 500 is produced.

The execution unit executes a load instruction to load the unit of data 525 into a set of registers. This unit of data 525 is loaded from the next aligned memory address (i.e. 0x80020) following the aligned memory address (i.e. 0x80010) from which the unit of data 516 is loaded. This address is given by the value of the source address in register $m0, which is incremented (i.e. to 0x80030) following the load instruction executed to load the unit of data 516.

Having loaded the data, the execution unit executes an extract instruction (shown as extract128 in FIG. 5F). This instance of the extract instruction is executed with a first operand specifying the set of registers into which the unit of data 525 has been loaded as a first source set of registers and a second operand specifying the set of registers into which the unit of data 516 has been loaded as a second source set of registers. In response to this instance of the extract instruction, the execution unit provides a unit of data 526. Since the pivot value in the $EXTRACT register is 14, the unit 526 comprises bytes of the unit of data 516 after the first 14 bytes of data of the unit 516 (in other words the last two bytes). The unit 526 also comprises the first 14 bytes of unit 525. The 14 bytes taken from unit 525 follow the two bytes taken from unit 516 in the data unit 526. The execution unit provides the unit of data 526 in a set of destination registers that are identified by the relevant operand of the extract instructions. The unit of data 526 stored in these destination registers forms the second atom of the body of the buffer 500.

After providing the unit of data 526, the execution unit executes a store instruction to store the unit of data 526 to memory. The unit of data 526 is stored at the aligned memory address (i.e. 0x82020) that is the next aligned memory address following the address at which the unit of data 520 was stored. This next aligned address is given by the value held in the $m1 register. After performing the store operation, the value in this register is incremented to point to the next aligned memory address (i.e. 0x82030).

Figure 5G:
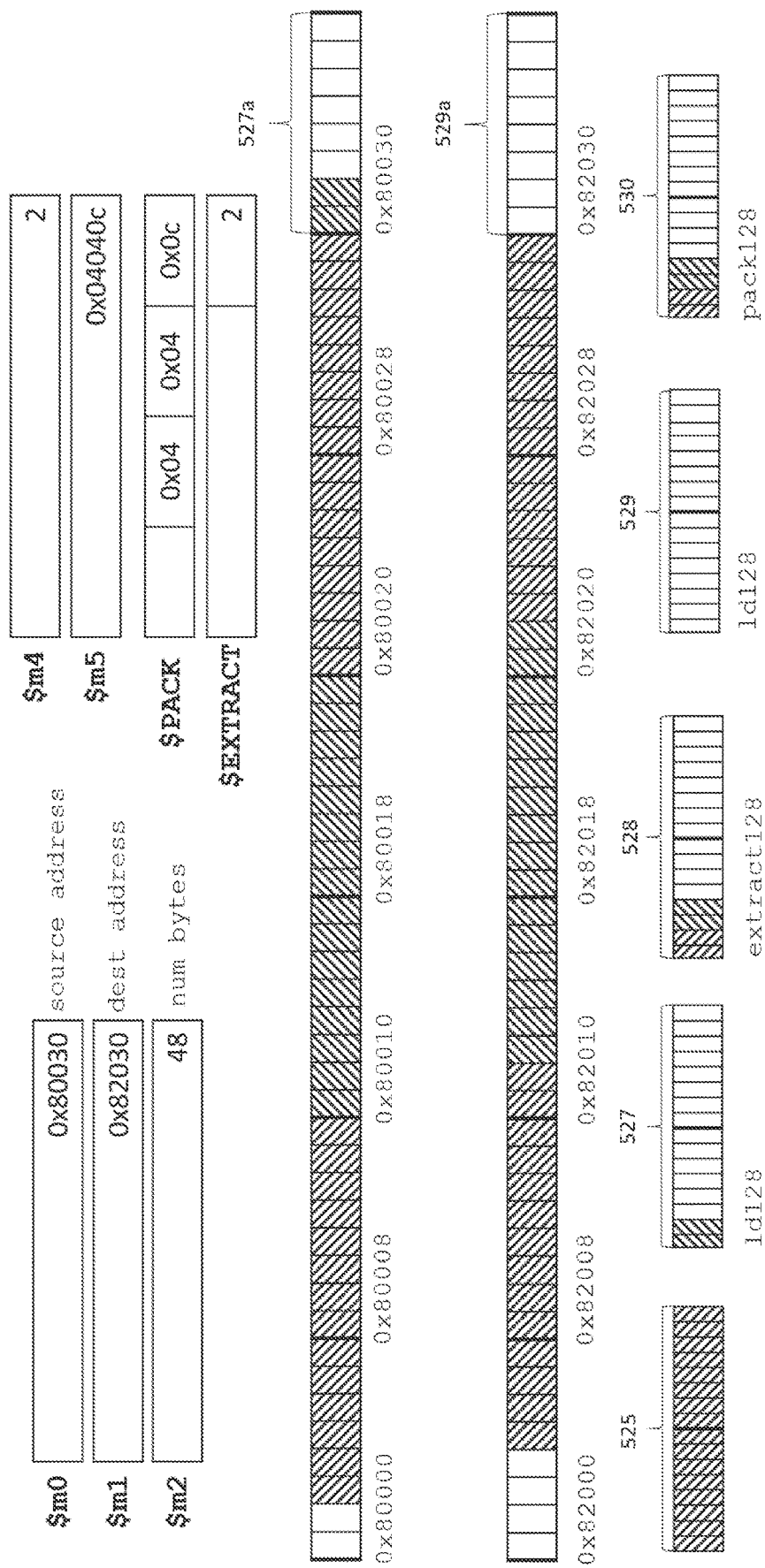
FIG. 5G illustrates the updates to the state of registers in response to execution of load instructions, a fourth extract instruction, and a second pack instruction.

Reference is made to FIG. 5G, which illustrates an example as to how the final atom (i.e. the tail) for storage in the destination memory may be produced. Providing this final atom involves executing the second pack instruction, which uses the second set of pack control values. In order to make these available when the second pack instruction is executed, the execution unit copies these values (from the $m5 register in the example) that were determined using the init128headtail instruction into the $PACK control register.

The execution unit executes a load instruction (shown as ld128) to load into a set of registers, a final data unit 527 from the source memory. Only a first half 527a of this data unit 527 is shown in the source memory in FIG. 5G. The execution loads this value from the source address value in $m0.

After loading the unit of data 529, the execution unit executes an extract instruction (shown as extract128 in FIG. 5G). This instance of the extract instruction is executed with a first operand specifying the set of registers into which the unit of data 527 has been loaded as a first source set of registers and a second operand specifying the set of registers into which the unit of data 525 has been loaded as a second source set of registers. In response to this instance of the extract instruction, the execution unit provides a unit of data 528. Since the pivot value in the $EXTRACT register is 14, the unit 528 comprises bytes of the unit of data 525 after the first 14 bytes of data of the unit 525 (in other words the last two bytes). The unit 528 also comprises the first 14 bytes of unit 527. The 14 bytes taken from unit 527 follow the two bytes taken from unit 525. The execution unit provides the unit of data 528 in a set of destination registers that is identified by the relevant operand of the extract instructions.

The execution unit executes a further load instruction (ld128) to load into a set of registers, the data unit 529 from the destination memory. Only the first half 529a of this data unit 529 is shown in FIG. 5G.

The execution unit executes the second pack instruction (shown as pack128 in FIG. 5G). This instance of the pack instruction takes one operand specifying as a source set of registers the registers containing the unit of data 528 and another operand specifying as a source set of registers the registers containing the unit of data 529. The result of execution of this pack instruction is that the unit of data 528 is copied into the destination set of registers for the pack instruction, with part of that data 528 then being overwritten by data from the unit of data 529. Given the extract value of four in the $PACK register, the execution unit causes data starting after the fourth byte in the data unit 529 to be written to the destination set of registers. Given the insert value of 0x04 in the $PACK register, the execution unit causes the extracted data to be written into the destination set of registers starting from an offset of four bytes from the start of the destination set of registers. Given the number of bytes value of 12 (0x0c in hexadecimal), the execution unit causes 12 bytes of the data unit 529 to be written to the destination set of registers. The effect of the pack instruction is to overwrite, with data from the destination memory, part of the data in the unit 528 that is not data from the buffer 500 that is being copied. The resulting unit of data 530 held in the set of destination registers is shown in FIG. 5B. This unit of data 530 resulting from the execution of the second pack instruction constitutes the final atom of data 530 to be stored to the destination memory as part of the memory copy.

Figure 5H:
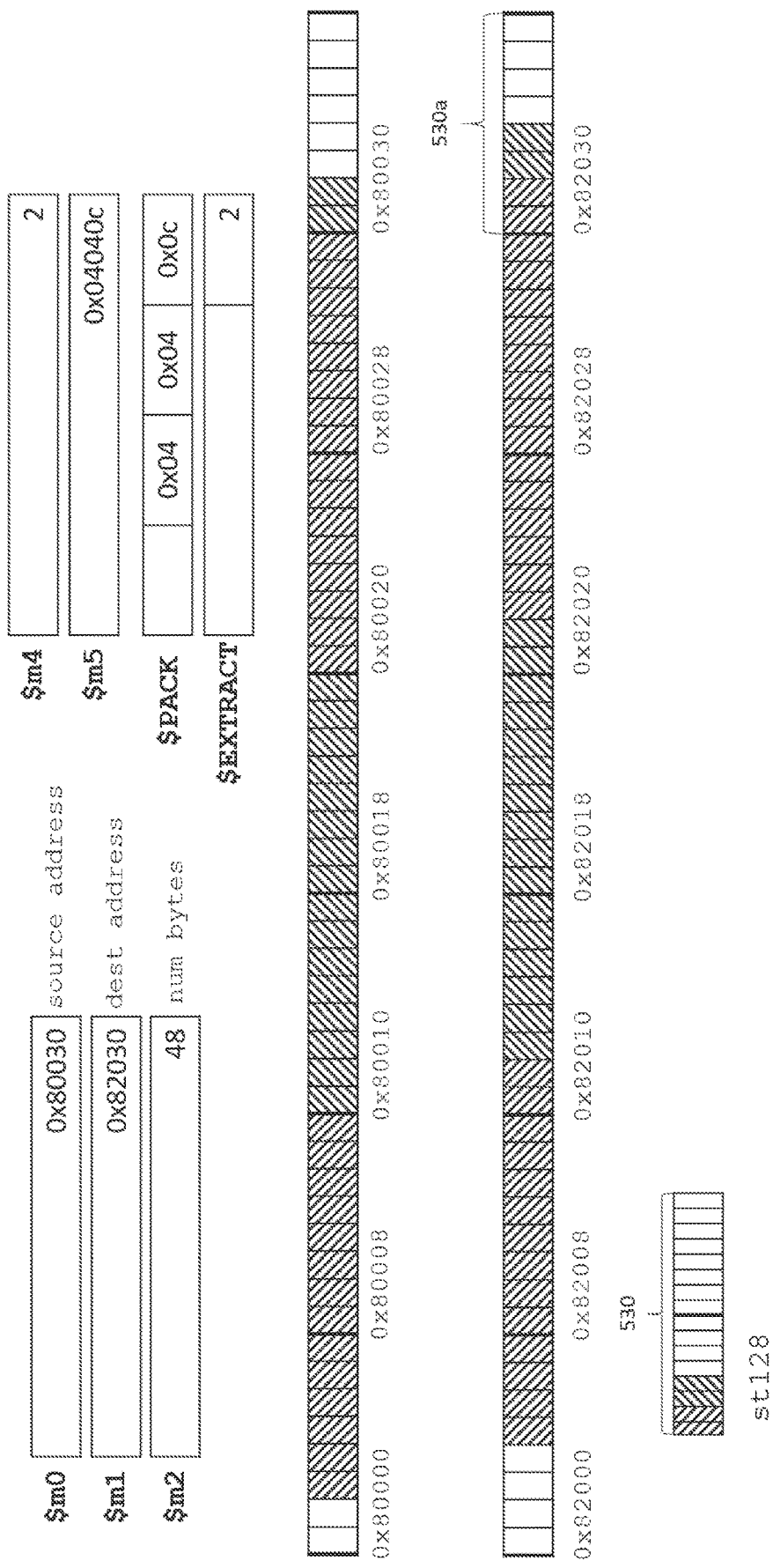
FIG. 5H illustrates the update to the state of memory in response to execution of a store instruction.

Reference is made to FIG. 5H, which illustrates how the execution unit executes a store instruction to store the data unit 530 into the destination memory. The execution of the store instruction causes the data unit 530 to be stored starting from the next aligned memory address (i.e. 0x82030) following the memory address at which the store of data unit 526 was performed. Only the first half 530a of this data unit 530 is shown in FIG. 5H.

Embodiments are not limited to use of the pack instruction for performing memory copies. For example, the pack instruction may be used to place misaligned data from memory in the appropriate location in one or more registers to be processed.

Figure 6:
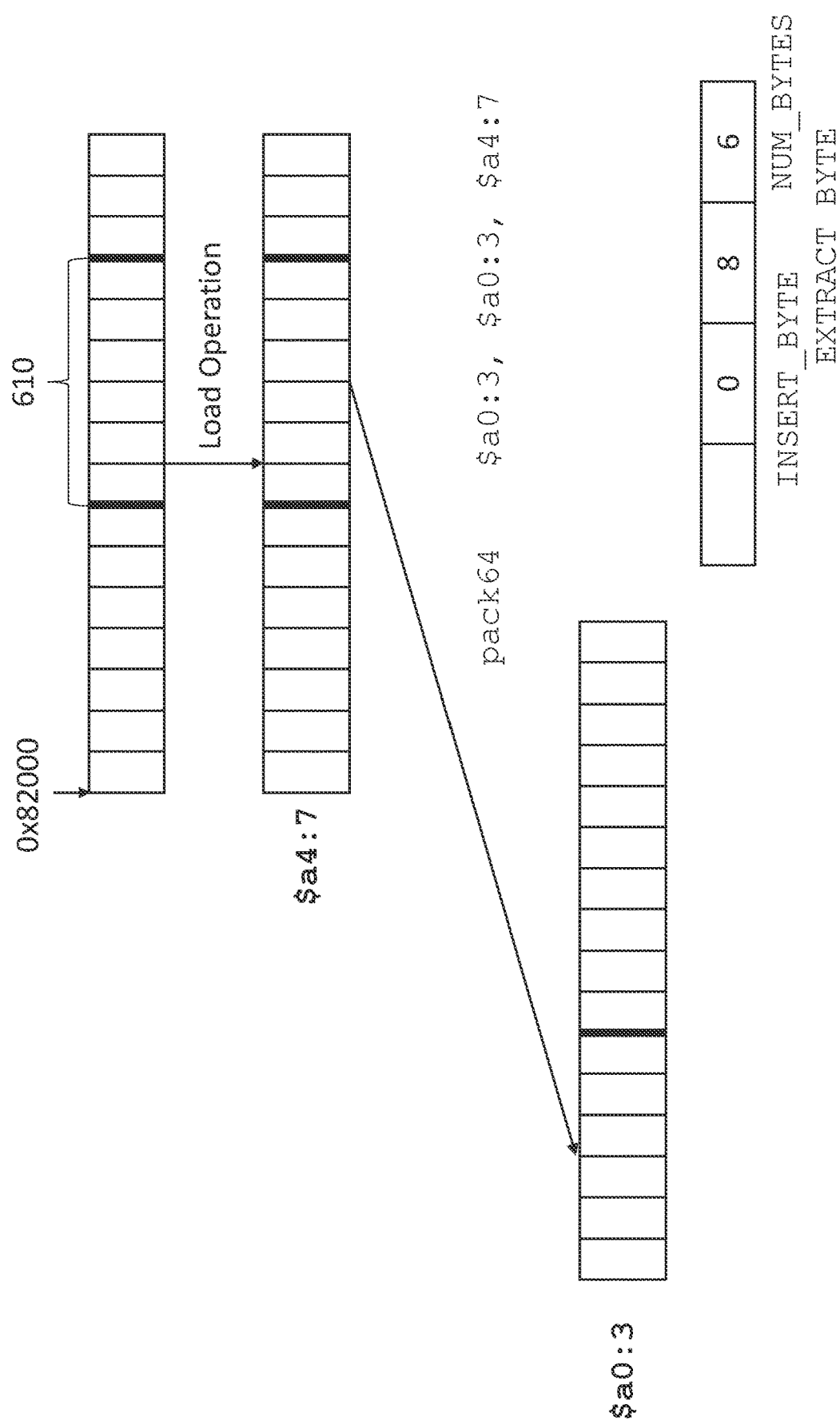
FIG. 6 illustrates the use of a single pack instruction for aligning data to be processed in memory.

Reference is made to FIG. 6, which illustrates an example of the use of a pack instruction to place data at the start of one or more registers for processing.

Suppose it is required to perform one or more arithmetic operations using data 610 stored in memory. Since the data 610 is not aligned in memory, a load instruction cannot be used to load the data 610 directly into the appropriate locations in one or more registers. Therefore, a load operation is performed to load a unit of data containing the data 610 into a set of registers $a4:7. This unit of data is shown starting at memory address 0x82000 in FIG. 6.

Once the data 610 is stored in the set of registers $a4:7, a pack instruction is executed to cause the data 610 to be stored at the start of a different set of registers $a0:3. The remaining part of registers $a0:3 will be occupied by the initial contents of that part of the registers $a0:3. One or more arithmetic operations may then be executed on the data 610 that is aligned at the start of relevant ones of the registers $a0:3.

It would be appreciated that embodiments have been described by way of example only. It would be appreciated that names used for the various instructions (e.g. pack, extract, init128headtail, init128body), registers (e.g. $PACK, $EXTRACT) and register values (e.g. pivot point, insert byte, extract byte, num bytes), are names only and are not to be construed as limiting.

Figure 7:
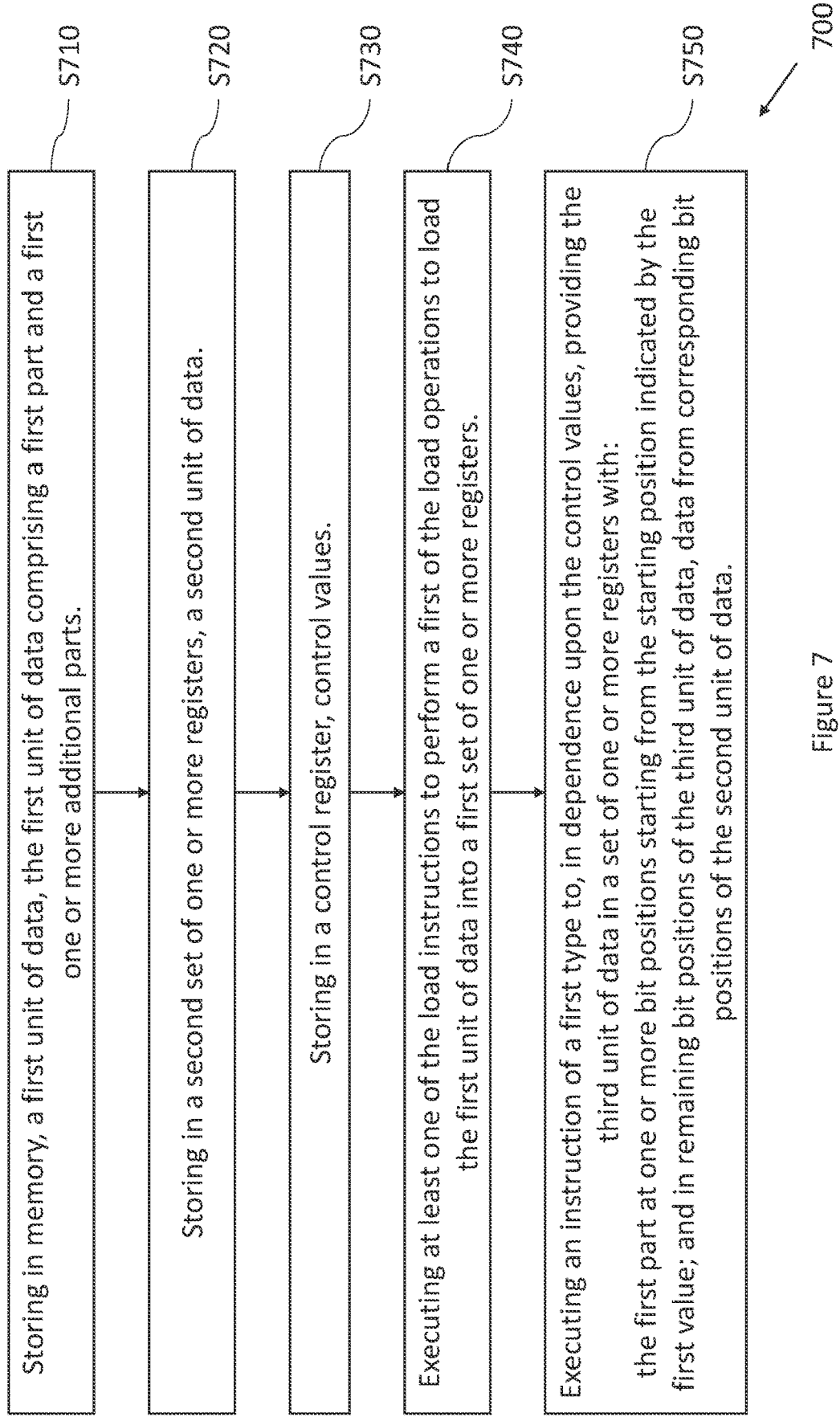
FIG. 7 illustrates a method according to embodiments of the application.

Reference is made to FIG. 7, which illustrates a method 700 according to embodiments of the application. The method 700 is a method for providing a third unit of data in set of register using a first set of data and a second set of data.

At S710, the first unit of data is stored in the memory 11 of the processing device 4. The first unit of data comprises a first part and one or more additional parts. The first unit of data may be stored in the memory 11 by the LSU 55 of the processing device 4 or by other circuitry (e.g. a receive engine) of the processing device 4 configured to store data received at the processing device 4 to the memory 11.

At S720, the second unit of data is stored in a second set of registers of the processing device 4. These registers may be registers of an ARF 26A. The second unit of data may be stored in these registers by execution of a load instruction to load the second unit of data from memory.

At S730, control values are stored in the $PACK control register.

At S740, the at least one execution unit executes a load instruction to load the first unit of data into a first set of one or more registers.

At S750, the at least one execution unit executes a pack instruction to, based on the control values, provided in a set of one or more registers, provide a third unit of data. The third unit of data comprises the first part at one or more bit positions starting from the starting position indicated by the first value; and in remaining bit positions of the third unit of data, data from corresponding bit positions of the second unit of data.

It would be appreciated that embodiments have been described by way of example only.

The invention claimed is:

1. A data processing device comprising:
 a memory; and
 at least one execution unit configured to execute load instructions to perform load operations to load data from the memory,
 wherein the memory is configured to store a first unit of data, the first unit of data comprising a first part and one or more additional parts,
 wherein the data processing device comprises a second set of one or more registers configured to store a second unit of data; and
 a control register configured to store control values including:
  a first value indicating a starting position at which the first part is to be provided in a third unit of data; and
  a second value indicating a starting position of the first part in the first unit of data; and
  a third value indicating a length of the first part,
 wherein the at least one execution unit is configured to:
  execute at least one of the load instructions to perform a first of the load operations to load the first unit of data into a first set of one or more registers; and
  in response to execution of an instruction of a first type, and in dependence upon each of the control values, store the third unit of data in a destination set of one or more registers with:
   the first part at one or more bit positions starting from the starting position indicated by the first value; and
   in remaining bit positions of the third unit of data, data from corresponding bit positions of the second unit of data.

2. The data processing device of claim 1, wherein the memory is configured to store the second unit of data, wherein the at least one execution unit is configured to, prior to executing the instruction of the first type:
 in response to execution of a further at least one of the load instructions, load the second unit of data into the second set of one or more registers.

3. The data processing device of claim 1, wherein the destination set of one or more registers is a third set of one or more registers that is different to the first set of one or more registers and the second set of one or more registers.

4. The data processing device of claim 1, wherein the destination set of one or more registers is the second set of one or more registers.

5. The data processing device of claim 4, wherein the at least one execution unit is configured to execute the instruction of the first type in order to write the first part to the second set of one or more registers such that the first part overwrites part of the second unit of data.

6. The data processing device of claim 1, wherein the at least one execution unit is configured to:
prior to execution of the instruction of the first type, execute an initialisation instruction to, using one or more operands indicating a location of a buffer of data in the memory, write the control values to the control register, wherein the buffer of data comprises the first part.

7. The data processing device of claim 6, wherein the one or more operands of the initialisation instruction further indicate a location of a memory region in the memory to which the buffer of data is to be copied.

8. The data processing device of claim 7, wherein the memory is configured to, prior to the execution of the instruction of the first type, store the second unit of data in the memory region.

9. The data processing device of claim 7, wherein the first unit of data belongs to the buffer of data.

10. The data processing device of claim 1, wherein the data processing device comprises a further control register configured to store a single value indicating:
a starting position of a third part of data within a fourth unit of data; and
an ending position of a fourth part of data within a fifth unit of data,
wherein the at least one execution unit is configured to:
execute a further instruction of a second type to, based on the single value, store in a set of one or more registers, a sixth unit of data, the sixth unit of data comprising:
the third part of data beginning at the starting position indicated by the single value; and
the fourth part of data ending at the ending position indicated by the single value.

11. The data processing device of claim 10, wherein the at least one execution unit is configured to perform a memory copy of a buffer in the memory by executing a sequence of instructions, wherein the memory is configured to store the buffer such that at least one of a start and end of the buffer is misaligned with a set of memory addresses supported as starting addresses for the load operations, the sequence of instructions comprising:
a first instance of the instruction of the first type;
a plurality of instances of the further instruction of the second type; and
a second instance of the instruction of the first type.

12. The data processing device of claim 11, wherein the at least one execution unit is configured to, prior to execution of the first instance of the instruction of the first type:
execute at least one initialisation instruction to, using one or more operands indicating a location of the buffer in the memory, write the single value to the further control register for use by at least one instance of the plurality of instances of the instruction of the second type and write to at least one register, the control values for use by the first instance and second instance of the further instruction of the first type.

13. The data processing device of claim 1, wherein the memory is configured to store the first part as part of the first unit of data such that at least one of a start or end of the first part is misaligned with a set of memory addresses supported for use as starting addresses for the load operations.

14. The data processing device of claim 13, wherein the set of memory addresses in the memory are spaced from one another by a fixed amount, the fixed amount comprising one of:
32 bits;
64 bits; or
128 bits.

15. A method implemented in a data processing device comprising at least one execution unit supporting execution of load instructions to perform load operations to load data from a memory of the data processing device, the method comprising:
storing in the memory, a first unit of data, the first unit of data comprising a first part and one or more additional parts;
storing in a second set of one or more registers, a second unit of data; and
storing in a control register, control values including:
a first value indicating a starting position at which the first part is to be provided in a third unit of data; and
a second value indicating the starting position of the first part in the first unit of data; and
a third value indicating a length of the first part,
executing at least one of the load instructions to perform a first of the load operations to load the first unit of data into a first set of one or more registers; and
in response to execution of an instruction of a first type, and in dependence upon each of the control values, storing the third unit of data in a destination set of one or more registers with:
the first part at one or more bit positions starting from the starting position indicated by the first value; and
in remaining bit positions of the third unit of data, data from corresponding bit positions of the second unit of data.

16. The method of claim 15, wherein the first unit of data comprises an amount of data associated with a given single load operation of the at least one execution unit.

17. The method of claim 15, wherein the destination set of one or more registers is a third set of one or more registers that is different to the first set of one or more registers and the second set of one or more registers.

18. The method of claim 15, wherein the destination set of one or more registers is the second set of one or more registers.

19. The method of claim 18, wherein executing the instruction of the first type includes writing the first part to the second set of one or more registers such that the first part overwrites part of the second unit of data.

20. The method of claim 15, further comprising:
prior to execution of the instruction of the first type, executing an initialisation instruction, including using one or more operands indicating a location of a buffer of data in the memory to write the control values to the control register, wherein the buffer of data comprises the first part.

21. A computer readable medium comprising a set of computer readable instructions which when executed by at least one execution unit of a processing device cause a method to be carried out, the computer readable instructions comprising load instructions, which when executed cause load operations for loading data from memory to be performed, the method comprising:

storing in the memory, a first unit of data, the first unit of data comprising a first part and a one or more additional parts;

storing in a second set of one or more registers, a second unit of data; and storing in a control register control values including:
  a first value indicating a starting position at which the first part is to be provided in a third unit of data; and
  a second value indicating the starting position of the first part in the first unit of data; and
  a third value indicating a length of the first part; and performing, in response to executing at least one of the load instructions, a first of the load operations to load the first unit of data into a first set of one or more registers; and in response to execution of an instruction of a first type, and in dependence upon each of the control values, storing the third unit of data in a destination set of one or more registers with:
  the first part at one or more bit positions starting from the starting position indicated by the first value; and
  in remaining bit positions of the third unit of data, data from corresponding bit positions of the second unit of data.

22. The computer readable medium of claim 21, wherein the first unit of data comprises an amount of data associated with a given single load operation of the at least one execution unit.

23. The computer readable medium of claim 21, wherein the destination set of one or more registers is a third set of one or more registers that is different to the first set of one or more registers and the second set of one or more registers.

24. The computer readable medium of claim 21, wherein the destination set of one or more registers is the second set of one or more registers.

25. The computer readable medium of claim 24, wherein the method further comprises executing the instruction of the first type includes writing the first part to the second set of one or more registers such that the first part overwrites part of the second unit of data.

26. The computer readable medium of claim 21, wherein the method further comprises:
  prior to execution of the instruction of the first type, executing an initialisation instruction, including using one or more operands indicating a location of a buffer of data in the memory to write the control values to the control register, wherein the buffer of data comprises the first part.

* * * * *